(12) United States Patent
Chen et al.

(10) Patent No.: US 9,013,860 B2
(45) Date of Patent: Apr. 21, 2015

(54) ASYMMETRIC HYBRID SUPERCAPACITORS BASED ON NANOTUBE NANOWIRE COMPOSITES

(75) Inventors: Zheng Chen, Los Angeles, CA (US); Yunfeng Lu, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 196 days.

(21) Appl. No.: 13/571,647

(22) Filed: Aug. 10, 2012

(65) Prior Publication Data

US 2013/0170098 A1      Jul. 4, 2013

Related U.S. Application Data

(63) Continuation of application No. PCT/US2011/024286, filed on Feb. 10, 2011.

(60) Provisional application No. 61/303,174, filed on Feb. 10, 2010, provisional application No. 61/415,712, filed on Nov. 19, 2010.

(51) Int. Cl.
| | |
|---|---|
| *H01G 9/00* | (2006.01) |
| *H01G 11/04* | (2013.01) |
| *H01G 9/04* | (2006.01) |
| *H01G 11/36* | (2013.01) |
| *H01G 11/46* | (2013.01) |
| *B82Y 30/00* | (2011.01) |

(52) U.S. Cl.
CPC ............... *H01G 11/04* (2013.01); *H01G 9/058* (2013.01); *H01G 9/155* (2013.01); *H01G 11/36* (2013.01); *H01G 11/46* (2013.01); *Y02E 60/13* (2013.01); *Y02T 10/7022* (2013.01); *B82Y 30/00* (2013.01)

(58) Field of Classification Search
CPC ....... H01G 9/155; H01G 9/058; H01G 11/00; H01G 11/32; H01G 11/36; H01G 11/38; H01G 11/46
USPC ......... 361/502, 503–504, 509, 512, 516–519, 361/523, 525, 528–529
See application file for complete search history.

(56) References Cited

U.S. PATENT DOCUMENTS

| | | | |
|---|---|---|---|
| 6,181,545 B1 * | 1/2001 | Amatucci et al. | 361/502 |
| 7,553,341 B2 * | 6/2009 | Pan et al. | 29/25.03 |

(Continued)

FOREIGN PATENT DOCUMENTS

| | | |
|---|---|---|
| WO | 2008124167 A1 | 10/2008 |
| WO | 2009094479 A1 | 7/2009 |

OTHER PUBLICATIONS

Noai, K., "'Nanohybrid Capacitor': The Next Generation Electrochemical Capacitors," Fuel Cell, Jul. 9, 2010, No. 5, pp. 825-833.

(Continued)

*Primary Examiner* — Nguyen T Ha
(74) *Attorney, Agent, or Firm* — John P. O'Banion

(57) ABSTRACT

An asymmetric supercapacitor includes a first structure and a second structure spaced apart from said second structure. One of the structures comprises an anode, and the other of the first and second structures comprises a cathode, wherein the first structure comprises an activated carbon electrode, and the second structure comprises a nanocomposite electrode. The nanocomposite electrode comprises a first network of nanowires that are interpenetrating with a second network of carbon nanotubes.

22 Claims, 29 Drawing Sheets

(56) References Cited

U.S. PATENT DOCUMENTS

| | | | |
|---|---|---|---|
| 7,903,390 B2* | 3/2011 | Fan | 361/502 |
| 8,373,971 B2* | 2/2013 | Young | 361/502 |
| 8,520,365 B2 | 8/2013 | Gruner | |
| 2009/0225498 A1 | 9/2009 | Lee et al. | |
| 2010/0178543 A1* | 7/2010 | Gruner et al. | 429/121 |
| 2011/0255214 A1 | 10/2011 | Gruner | |
| 2011/0261502 A1 | 10/2011 | Gruner | |

OTHER PUBLICATIONS

Korean Intellectual Property Office (KIPO), International Search Report and Written Opinion issued on Nov. 29, 2011 (pp. 1-9), including claims searched (pp. 10-13), for related PCT International Patent Application PCT/US2011/024286, pp. 1-13.

* cited by examiner

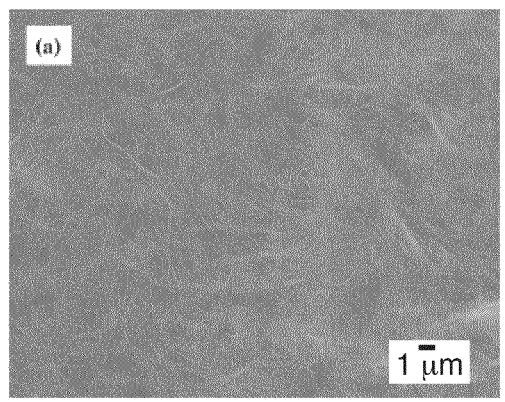
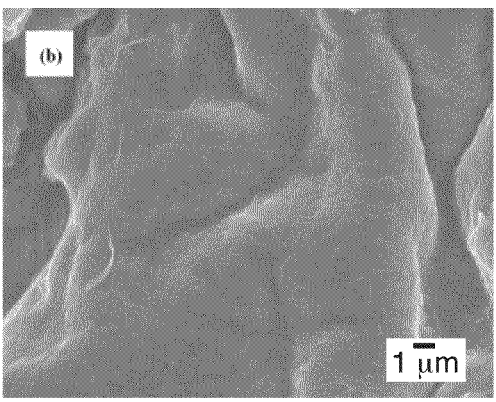
FIG. 27A  FIG. 27B
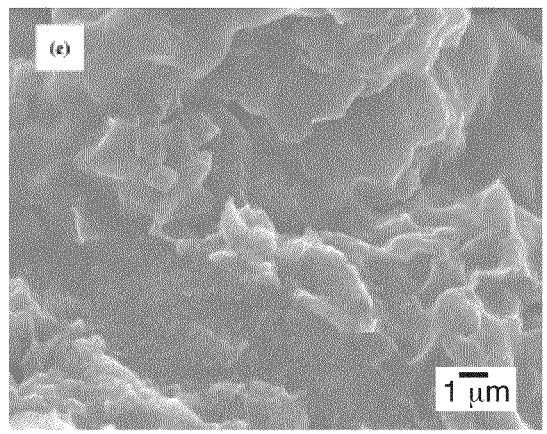
FIG. 27C

ASYMMETRIC HYBRID SUPERCAPACITORS BASED ON NANOTUBE NANOWIRE COMPOSITES

CROSS-REFERENCE TO RELATED APPLICATIONS

This application a 35 U.S.C. §111(a) continuation of PCT international application number PCT/US2011/024286 filed on Feb. 10, 2011, incorporated herein by reference in its entirety, which is a nonprovisional of U.S. provisional patent application Ser. No. 61/415,712 filed on Nov. 19, 2010, incorporated herein by reference in its entirety, and which is also a nonprovisional of U.S. provisional patent application Ser. No. 61/303,174 filed on Feb. 10, 2010, incorporated herein by reference in its entirety. Priority is claimed to each of the foregoing applications.

The above-referenced PCT international application was published as PCT International Publication No. WO 2011/100391 on Aug. 18, 2011 and republished on Jan. 19, 2012, and is incorporated herein by reference in its entirety.

This application is related to PCT International Application No. PCT/US2009/053527 filed on Aug. 12, 2009 and published on Feb. 18, 2010 as PCT Publication No. WO 2010/019648, which claims priority to U.S. Provisional Patent Application Ser. No. 61/089,221 filed on Aug. 15, 2008. Each of the foregoing applications and publications is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to supercapacitors, and more particularly to supercapacitors with nanowire composites.

2. Description of Related Art

An ideal electrical energy storage device provides both high energy and power density. The state-of-art electrical energy storage technology is primarily based on either lithium ion batteries with low power density (normally less than 1000 W/kg) or electrical double layer capacitors (in the range of 3-6 Wh/kg), which limits their wide application in heavy-duty facilities, electric vehicles, mobile electrical tools and consumer electronics.

Supercapacitors are emerging as a new-generation of energy storage device. However, with aqueous electrolyte based supercapacitors, which are limited by low cell potential, it is difficult to achieve high energy density. Current supercapacitors utilizing active carbon in organic or ionic liquid electrolyte have energy densities approaching 10 Wh/kg. While supercapacitors exhibit significantly higher power densities compared to batteries, but their use in electronic devices and industrial applications is limited based on their poor energy density.

Since the energy density (E) of a capacitor is governed by $E=\frac{1}{2}CV^2$, where C is the capacitance and V is the cell potential, increasing the potential or capacitance leads to higher energy density. In this context, the most commonly used electrode material (porous carbon) generally possesses double layer capacitances of around 100 F $g^{-1}$, which can provide a specific energy density up to 25 Wh $kg^{-1}$ in an organic-electrolyte based symmetric device. Somewhat greater energy densities can be reached as specific capacitances of up to 150 $F^{g-1}$ with carbide-derived carbon have been reported. By comparison, transition-metal oxides possess significantly higher specific capacitance via pseudocapacitance. For example, $RuO_2$, $MnO_2$ and NiO have demonstrated specific capacitance up to 1300, 1200, and 940 F $g^{-1}$, respectively. Some devices are based on the $TiO_2$ (B) nanowire or $Li_4Ti_5O_{12}$ as anode and activated carbon (or CNTs) as cathode, which provide devices with an energy density from 10-20 Wh/kg.

Thus, an asymmetric supercapacitor consisting of a carbon cathode and an oxide anode may provide a significantly higher energy density than symmetric capacitors based on carbon; asymmetric cells containing an anode of $Li_4Ti_5O_{12}$ and a cathode of activated carbon (AC) can provide an energy density in excess of 35 Wh $kg^{-1}$. Nevertheless, building such high-energy density asymmetric devices has been highly challenging, mainly due to the kinetics of the pseudocapacitive electrode. In order to minimize the kinetic limitations, most of the pseudocapacitive electrodes made today are limited to sub-micron thin films. Since the electrochemically inert components of a supercapacitor, including the current collectors, separator, and packaging, account for a large fraction of the total weight of the device, the use of thin electrodes results in a significantly lower energy density than what could be attained using thicker electrodes.

Accordingly an object of the present invention is energy storage system that includes both high power and high energy density.

Another object is an asymmetric supercapacitor coupling both a Faradaic electrode and double-layer electrode in a single cell to get higher energy density as well as high power density and cycling life.

Another object is a thick electrode for supercapacitors for making high-energy supercapacitors for practical applications.

BRIEF SUMMARY OF THE INVENTION

An aspect of the invention is a supercapacitor having activated carbon as an anode and a $V_2O_5$/CNT nanocomposite as a cathode to construct a quasi-cell in 1 M $LiClO_4$ in propylene carbonate as a flood cell.

Another aspect of the invention is pseudocapacitive anode materials for asymmetric supercapacitors composed of interpenetrating networks of carbon nanotubes (CNTs) and $V_2O_5$ nanowires. The CNTs and nanowires were intimately intertwined into a hierarchically porous structure, enabling effective electrolyte access to the electrochemically active materials without limiting charge transport. Such composites exhibited high specific capacitance (>300 F g$^{-1}$) at high current density (1 A g$^{-1}$) in aqueous electrolyte.

Another aspect is a method for fabrication of high energy-density asymmetric supercapacitors containing thick-film electrodes (over 100 μm thick) comprising CNT/V$_2$O$_5$ nanowire composite in combination with an organic electrolyte to allow for a higher initial cell potential. The high conductivity, high specific capacitance, and large voltage window of the CNT/V$_2$O$_5$ nanocomposite enable the fabrication of devices with an energy density as high as 40 Wh kg$^{-1}$ at a power density of 210 W kg$^{-1}$. Even at a high power density of 6300 W kg$^{-1}$, the device of the present invention possesses an energy density of 6.9 Wh kg$^{-1}$. Moreover, the resulting devices exhibit excellent cycling stability.

A still further aspect of the invention is an asymmetric supercapacitor, comprising: a first structure spaced apart from a second structure; wherein one of the first and second structures comprises an anode, and the other of the first and second structures comprises a cathode; wherein the first structure comprises an activated carbon electrode; wherein the second structure comprises a nanocomposite electrode; and wherein the nanocomposite electrode comprises a first network of nanowires that are interpenetrating with a second network of nanowires.

Another aspect is an electrical energy storage device, comprising: an anode and a cathode; wherein the anode comprises an activated carbon electrode and the cathode comprises a nanocomposite electrode; and wherein the nanocomposite electrode comprises a first network of nanowires that are interpenetrating with a second network of nanowires to form a mesh structure.

Yet another aspect is an electrical energy storage device, comprising: an anode and a cathode; wherein the cathode comprises an activated carbon electrode and the anode comprises a nanocomposite electrode; and wherein the nanocomposite electrode comprises a first network of nanowires that are interpenetrating with a second network of nanowires to form a mesh structure having hierarchical porous channels Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIGS. 27A, 27B and 27C are SEM images of nanocomposites according to certain embodiment of the present invention and having different compositions: (a) CVC-1, (b) CVC-3 and (c) CVC-4.

DETAILED DESCRIPTION OF THE INVENTION

Figure 1:
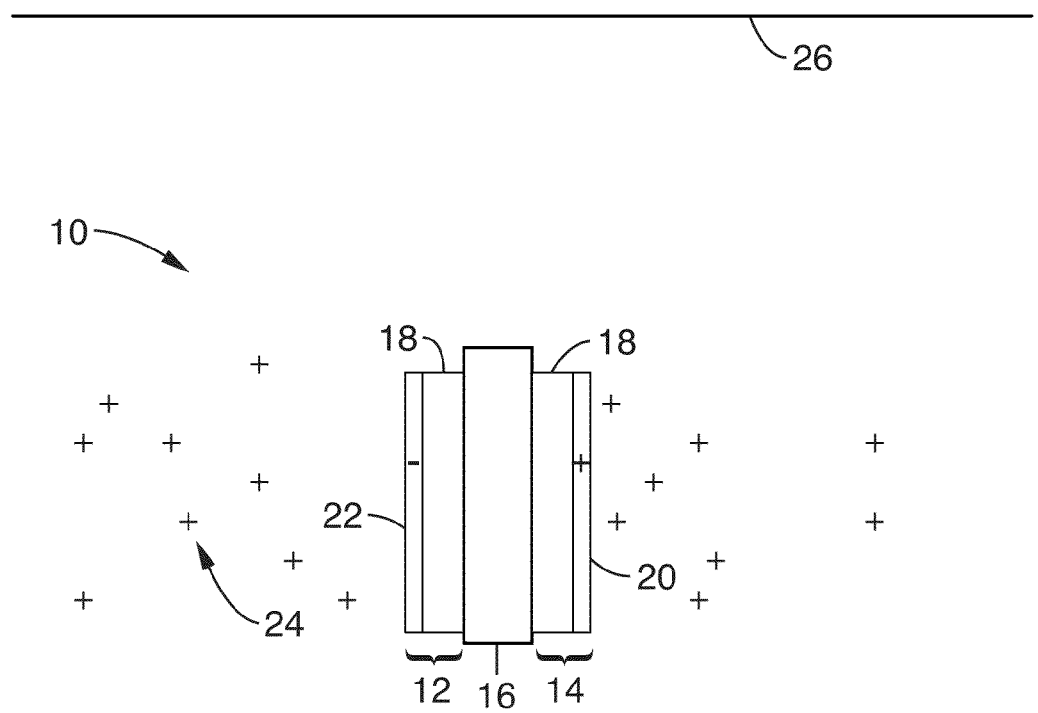
FIG. 1 is schematic diagram of an asymmetric quasi-cell having a CNT/V$_2$O$_5$ cathode and activated carbon anode disposed in a flood cell in accordance with the present invention.

For illustrative purposes, the present invention is embodied in the apparatus generally shown in the drawings. FIGS. 1 through 4D illustrate an apparatus and experimental results for an embodiment of the present invention comprising an asymmetric quasi-cell having a CNT/$V_2O_5$ cathode and activated carbon (AC) anode. FIGS. 5 through 15 illustrate an apparatus and experimental results for an embodiment of the present invention comprising an asymmetric quasi-cell having a CNT/$V_2O_5$ anode and activated carbon (AC) cathode. FIGS. 16A through 27C illustrate an electrode configuration that may be used in either of the embodiments shown in FIGS. 1 though 15. It will be appreciated that the apparatus may vary as to configuration and as to details of the parts, and that the method may vary as to the specific steps and sequence, without departing from the basic concepts as disclosed herein.

I. Asymmetric Quasi-Cell with Nanocomposite Cathode and AC Anode.

FIG. 1 is schematic diagram of an asymmetric quasi-cell 10 of the present invention having a CNT/$V_2O_5$ cathode 14 and activated carbon (AC) anode 12 disposed in a flood cell 26 of electrolytic solution 24. For the preparation of each single electrode, the electrode active materials (e.g. activated carbon or $V_2O_5$/CNT nanocomposite) were coated onto nickel foam current collectors 18 to fabricate porous electrodes (20, 22). To prepare the electrodes, 80% of the testing materials, 10% carbon black, and 10% poly(vinylidene fluoride) (PVDF) dispersed in N-methylpyrrolidinone (NMP) were mixed to form homogeneous slurries. The slurries were ultrasonically treated at 60° C. for at least 0.5 hours, coated on the nickel foam substrate 18, and dried at 80° C. for 10 minutes under vacuum. The formed electrodes 12, 14 were then pressed at a pressure of 2 MPa and further dried under vacuum at 100° C. for 12 h. The cathode 14 and anode 12 were assembled adjacent either side of glass fiber separator 16.

Each electrode was tested by cyclic voltammetry (CV) and galvanostaic charge and discharge under potentiostat in a three-electrode cell. Lithium foil (not shown) was used as both counter and reference electrodes and the electrolyte 24 was 1 M $LiClO_4$ in propylene carbonate. CV and galvanostaic charge and discharge were performed at constant current density with a cutoff voltage of 4.0-1.5 V in three-electrode cell. For a 2-electrode quasi-cell, the activated carbon electrode was used as the anode 12 and the $V_2O_5$/CNT nanocomposite electrode was the cathode 14. The cut-off voltage was designated to be 0-2.5 V, 0-2.7 V and 0-3.2V, respectively.

The electrodes and cells were tested under different scan rates and current densities under the condition described above. With various mass loading, currents of 2 mA, 1 mA and 0.5 mA were used to charge and discharge single electrode. The results listed below are the charge-discharge plots of single electrodes 12, 14 and quasi-cell configuration 10. The cell specific capacitance was calculated based on electrode active materials, while the energy and power densities are calculated from the total weight of the electrode materials.)

Figure 2A:
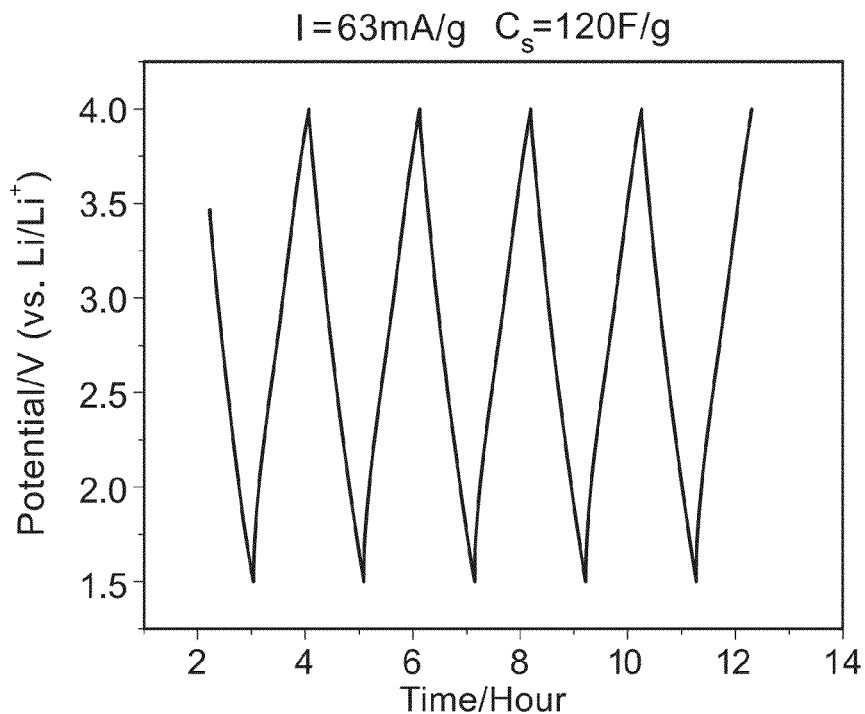
FIG. 2A is a plot of charge/discharge at the current densities of an activated carbon electrode at 2 mA.
Figure 2B:
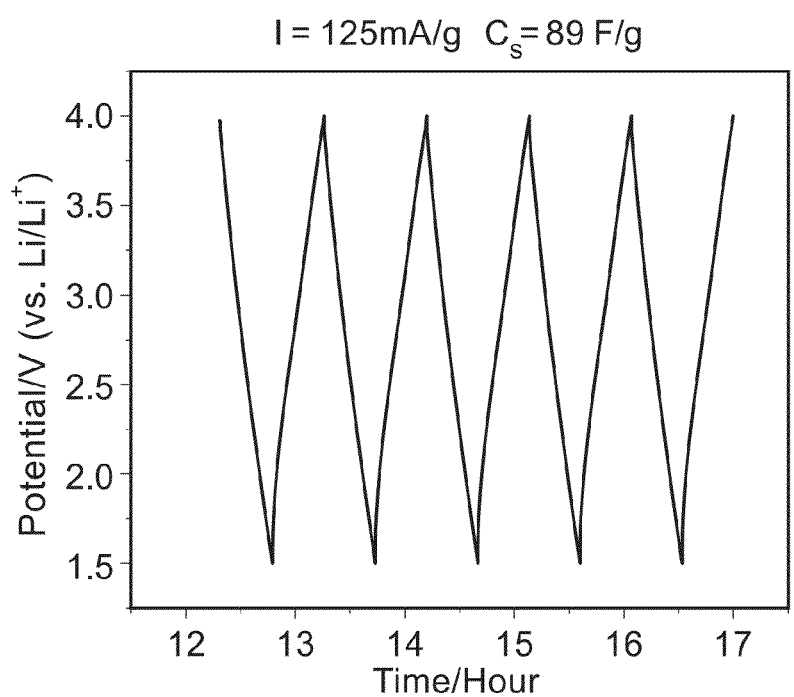
FIG. 2B is a plot of charge/discharge at the current densities of an activated carbon electrode at 1 mA.
Figure 2C:
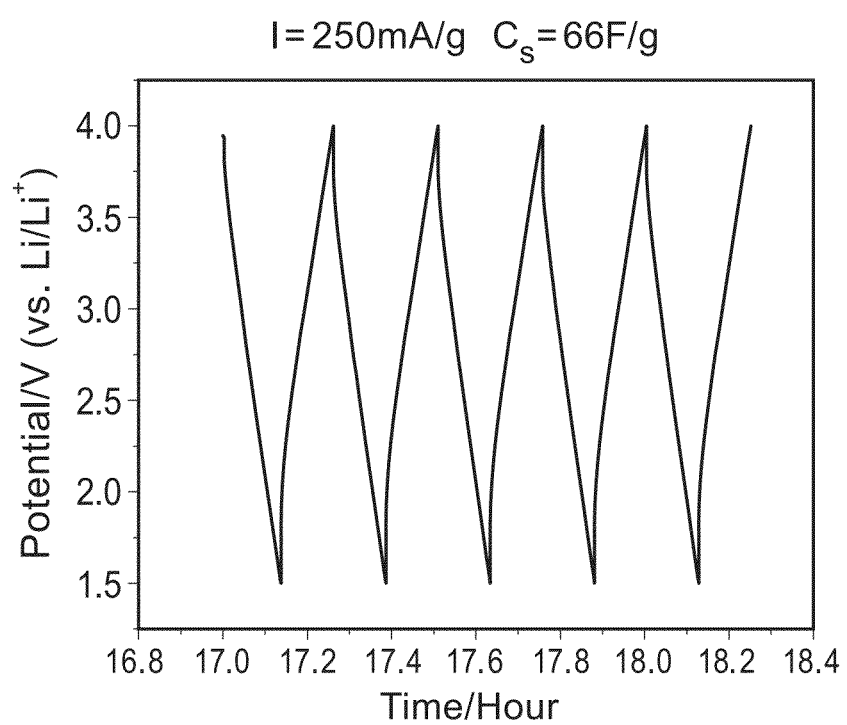
FIG. 2C is a plot of charge/discharge at the current densities of an activated carbon electrode at 0.5 mA.

FIGS. 2A, 2B and 2C show plots of the current densities of an activated carbon electrode 12 with total mass loading of 7.97 mg (which contains 7.97*0.8 mg of activated carbon), tested at 2 mA (FIG. 2A), 1 mA (FIG. 2B), and 0.5 mA (FIG. 2C), which gave specific capacitance of 66 F/g, 89 F/g, and 120 F/g, respectively. The corresponding current densities were 63 mA/g, 125 mA/g and 250 mA/g respectively.

Figure 3A:
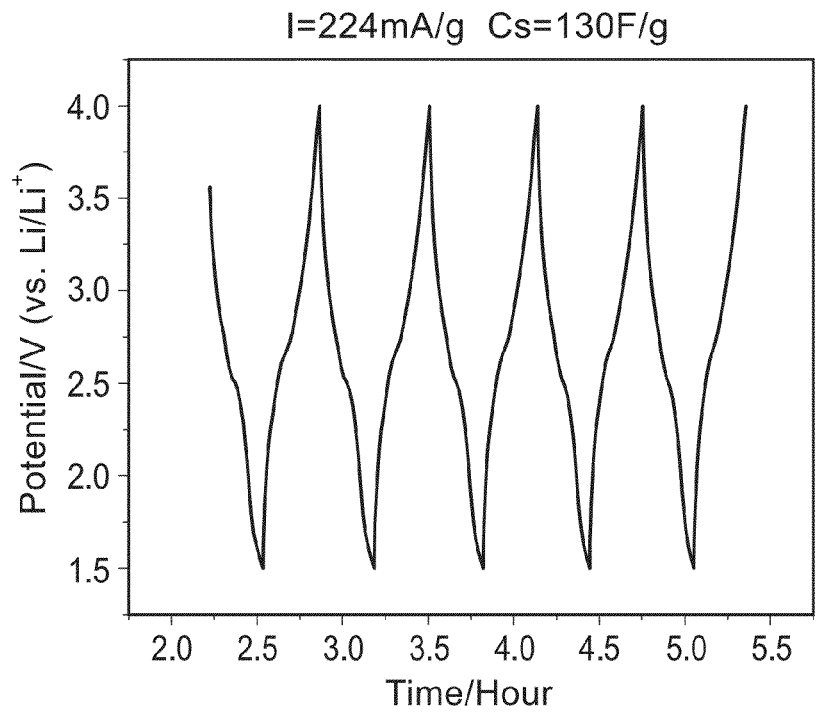
FIG. 3A is a plot of charge/discharge at the current densities of a CNT/V$_2$O$_5$ nanocomposite electrode at 2 mA.
Figure 3B:
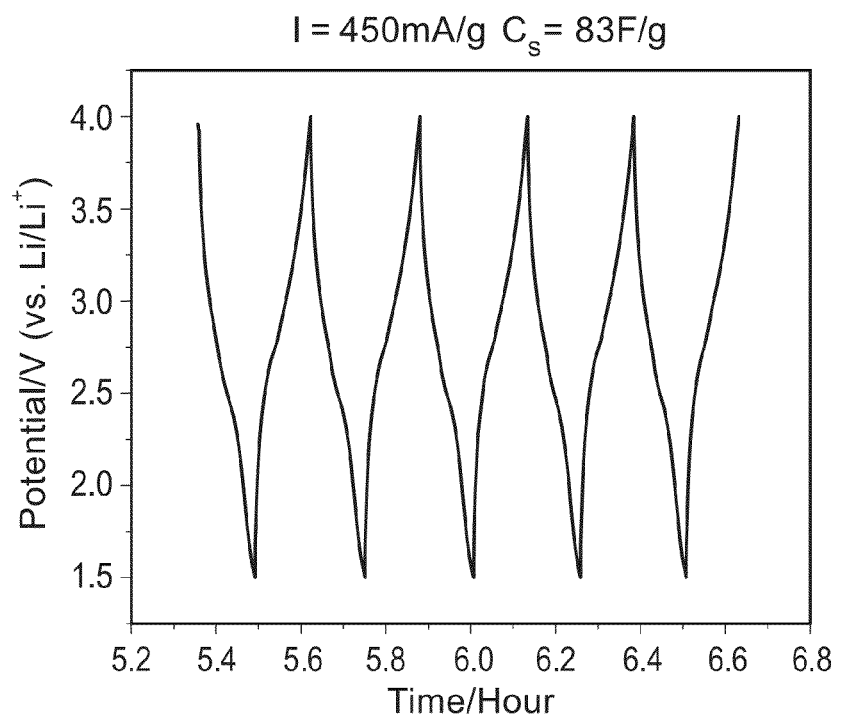
FIG. 3B is a plot of charge/discharge at the current densities of a CNT/V$_2$O$_5$ nanocomposite electrode at 1 mA.
Figure 3C:
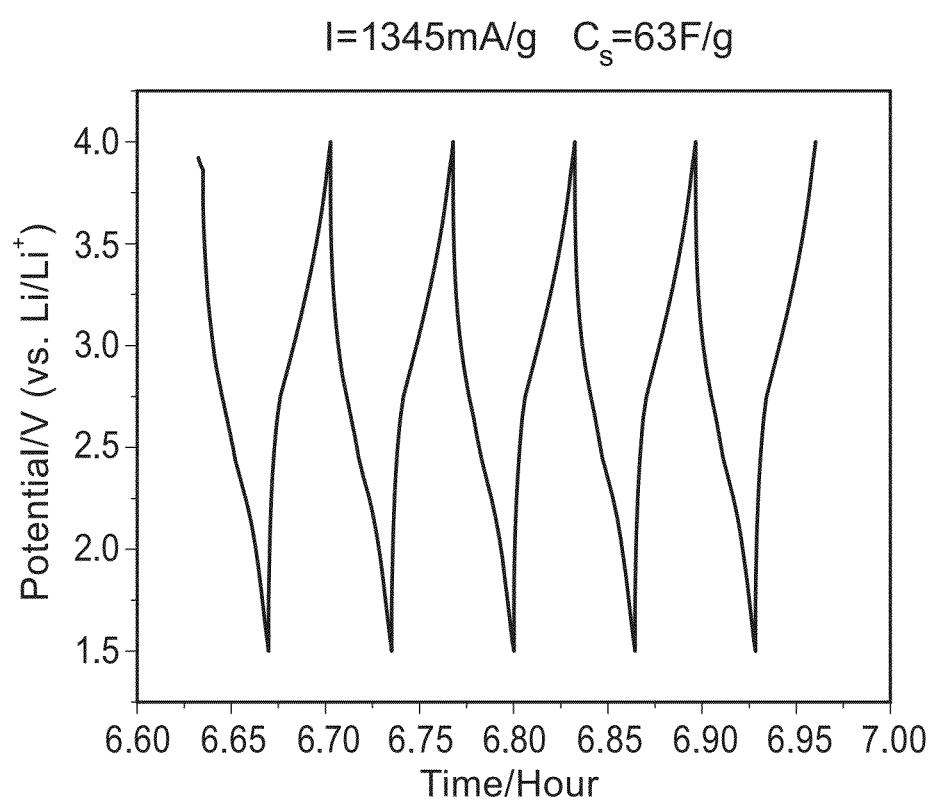
FIG. 3C is a plot of charge/discharge at the current densities of a CNT/V$_2$O$_5$ nanocomposite electrode at 0.5 mA.
Figure 4A:
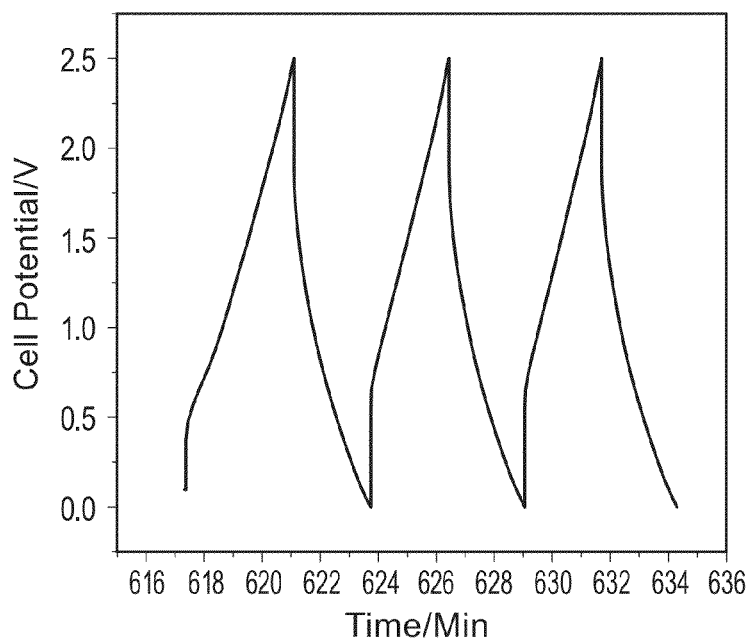
FIG. 4A is a plot of charge/discharge at the current densities of a quasi-cell using a CNT/V$_2$O$_5$ nanocomposite electrode at 2 mA.
Figure 4B:
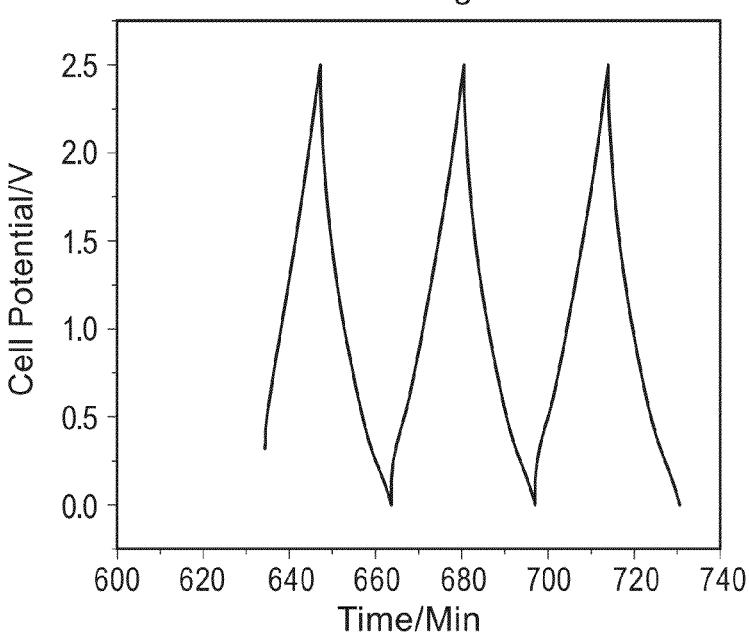
FIG. 4B is a plot charge/discharge at of the current densities of a quasi-cell using a CNT/V$_2$O$_5$ nanocomposite electrode at 1 mA.
Figure 4C:
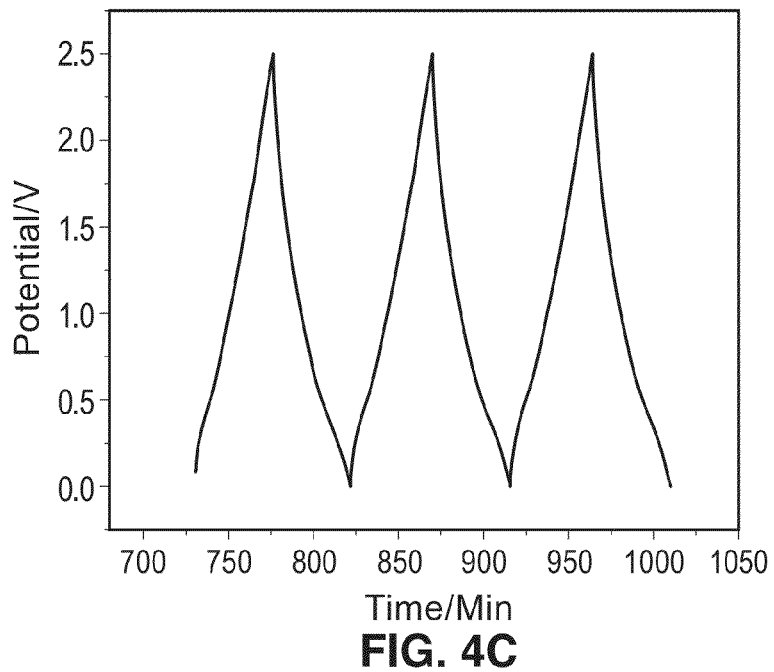
FIG. 4C is a plot of charge/discharge at the current densities of a quasi-cell using a CNT/V$_2$O$_5$ nanocomposite electrode at 0.2 mA.
Figure 4D:
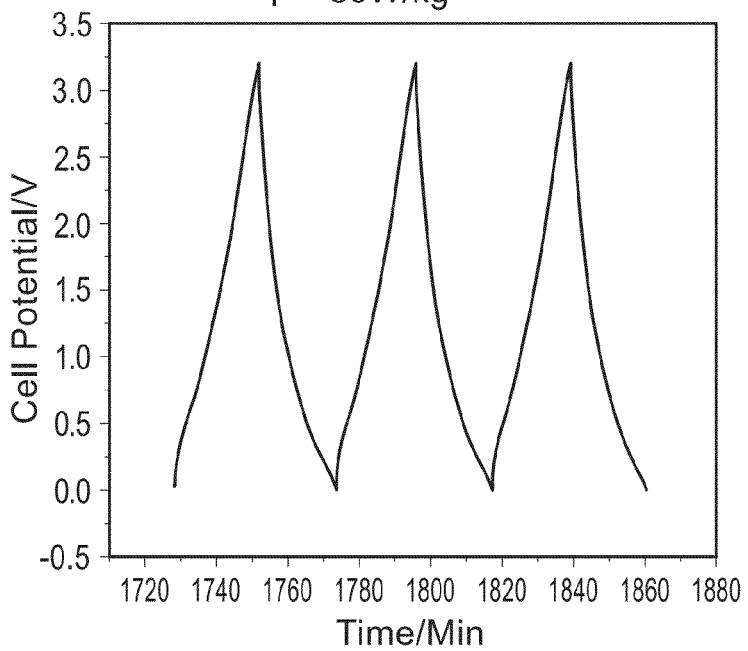
FIG. 4D is a plot of charge/discharge at the current densities of a quasi-cell using a CNT/V$_2$O$_5$ nanocomposite electrode at 0.5 mA.

FIGS. 3A, 3B and 3C show plots of the current densities of the $V_2O_5$/CNT nanocomposite electrode 14 with total mass loading of 2.32 mg (which contains 2.32*0.8 mg of $V_2O_5$/CNT nanocomposite), tested at 2 mA (FIG. 3A), 1 mA (FIG. 3B), and 0.5 mA (FIG. 3C), which gave specific capacitance of 63 F/g, 83 F/g, and 130 F/g, respectively. The corresponding current densities were 224, 450 and 1345 mA/g, respectively. These results indicate the rate capability of $V_2O_5$/CNT electrode is higher than that of active carbon electrode.

FIGS. 4A, 4B, 4C and 4D show plots of the current densities of the quasi-cell 10 assembled by using a $V_2O_5$/CNT nanocomposite electrode 20 with total mass loading of 5.9 mg (which contains 5.9*0.8 mg of V$_2$O$_5$/CNT nanocomposite) as the cathode 14 and an activated carbon electrode 22 with total mass loading of 7.97 mg (which contains 7.97*0.8 mg of activated carbon) as the anode 12. This cell 10 was tested at 2 mA (FIG. 4A), 1 mA (FIG. 4B), and 0.2 mA (FIG. 4C) at a cut-off voltage of 0-2.5 V, which gave energy densities of 8.0, 12.5 and 14.6 Wh/kg, respectively. Corresponding power densities were 180, 45 and 18 W/kg, respectively. When the cell 10 was charged and discharge at current of 0.5 mA (FIG. 4D) between 0-3.2V, the cell gave energy density of 21 Wh/kg and power density of 50 W/kg, which is based on the total electrode mass.

II. Asymmetric Quasi-Cell with Nanocomposite Anode and AC Cathode.

Figure 5:
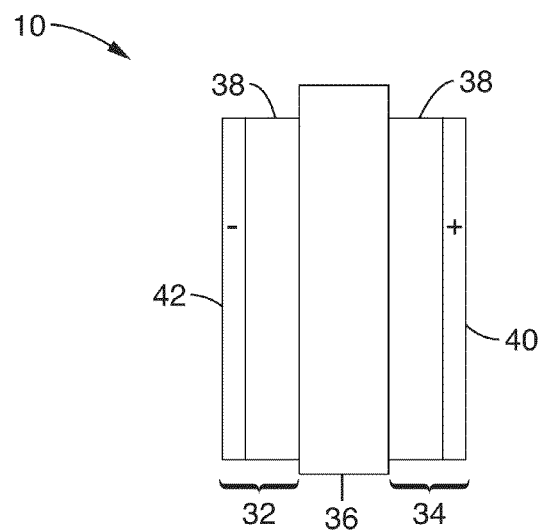
FIG. 5 is schematic diagram of an asymmetric quasi-cell having a CNT/V$_2$O$_5$ anode and activated carbon cathode in accordance with the present invention.

FIG. 5 is schematic diagram of an asymmetric quasi-cell 30 having a CNT/V$_2$O$_5$ anode 34 and activated carbon cathode 32.

The V$_2$O$_5$ nanowires, CNT/V$_2$O$_5$ nanowire composites and activated carbon were assembled onto nickel foam current collectors 38. The activated carbon ($S_{BET}$=1900 m$^2$ g$^{-1}$) has a gravimetric capacitance of 115 and 61 F g$^{-1}$ at CV scan rates of 1 and 20 mV s$^{-1}$ respectively (see FIG. 14). 80% of the electrochemically active material, 10% carbon black, and 10% poly(vinylidene fluoride) (PVDF) dispersed in N-methylpyrrolidinone (NMP) were mixed to form slurries. The homogenous slurries were coated on a nickel foam substrate 38 and dried at 80° C. for 10 min under vacuum. The formed electrodes 40, 42 were then pressed at a pressure of 2 MPa and further dried under vacuum at 100° C. for another 12 h.

Figure 15:
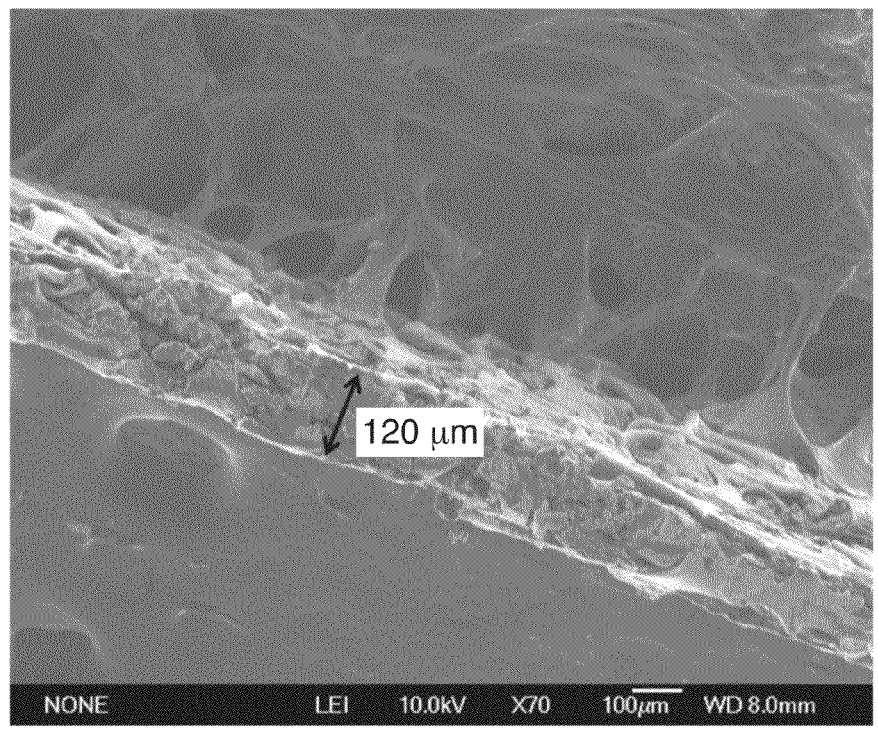
FIG. 15 is an SEM image showing the thickness of the nanocomposite electrode of the present invention to be over 100 μm.

Thick electrodes were obtained by coating an active mass of 3 to 5 mg on each current collector 38. As illustrated in FIG. 15, nanocomposite electrode 40 with an active mass of 3.8 mg has a thickness of ~120 μm (see FIG. 15).

To make 2032 type coin battery cells, glass fiber layer 36 (e.g. (GF/D) fiber from Whatman, Inc.) was used as the separator. CNT/V$_2$O$_5$ anode 34 and activated carbon cathode 32 were assembled on opposing sides of separator 36 to form cell 30. The cells were assembled in a glovebox under an argon atmosphere.

Figure 13:
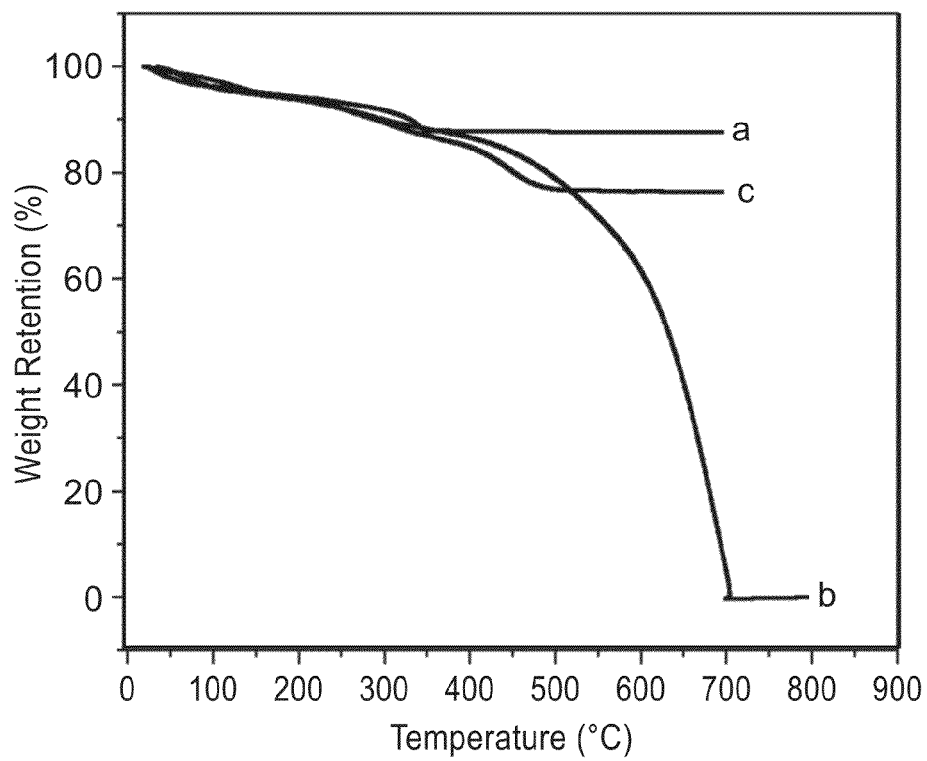
FIG. 13 shows thermogravimetric analysis for electrodes made of V$_2$O$_5$ nanowires (a), pre-treated CNTs (b), and CNT/V$_2$O$_5$ composites (c).
Figure 14:
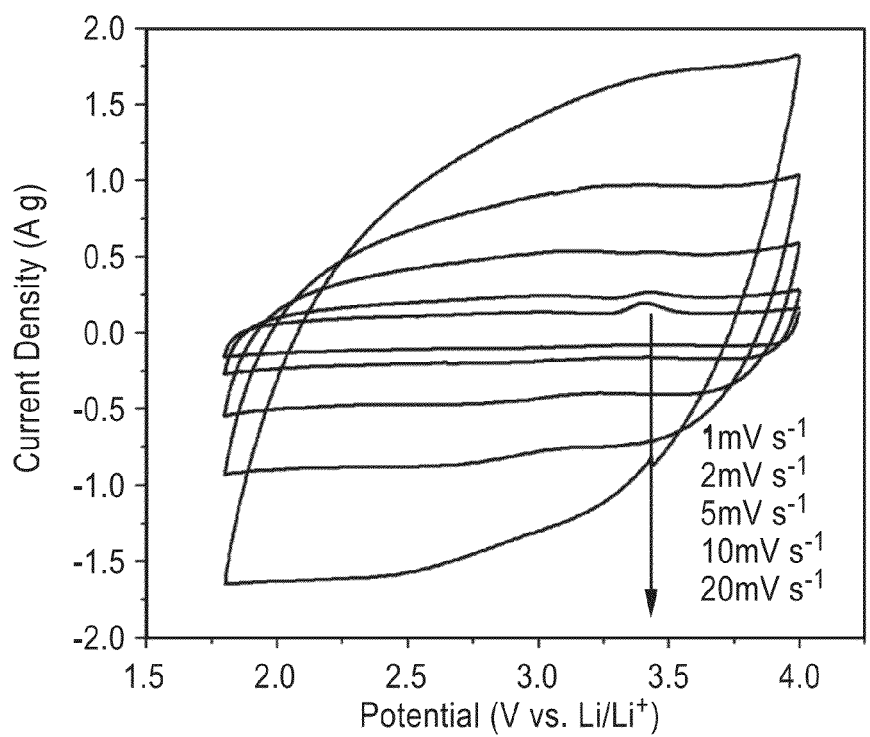
FIG. 14 illustrates cyclic voltammograms of the electrodes made of commercial activated carbon.

CNT/V$_2$O$_5$ nanocomposite 40 was synthesized through a one-pot hydrothermal process using aqueous vanadium-oxide precursors in the presence of pre-treated hydrophilic CNTs. Grams of this composite were produced using a lab-scale reactor. Details of the materials synthesis are described in more detail in section III below. The composition of the CNT/V$_2$O$_5$ composite 40 was determined by thermogravimetric analysis (see FIG. 13, showing thermogravimetric analysis (TGA) of electrodes made of V$_2$O$_5$ nanowires (a), pre-treated CNTs (b), and CNT/V$_2$O$_5$ composites (c)). Nitrogen sorption isotherms were measured at 77 K with a Micromeritics ASAP 2020 analyzer. The specific surface areas ($S_{BET}$) were calculated by the Brunauer-Emmett-Teller (BET) method using an adsorption branch in a relative pressure range from 0.04 to 0.25. Scanning electron microscopy (SEM) experiments were conducted on a JEOL JSM-6700 FE-SEM. Transmission electron microscopy (TEM) experiments were conducted on a Philips CM120 operated at 120 kV.

The electrochemical measurements were carried out on a Solartron 1860/1287 Electrochemical Interface. The electrolyte solution was a 1 M LiClO$_4$ in propylene carbonate (PC) solution and lithium foils were used as both the counter and reference electrodes. CV measurements were carried out in an argon-filled glove box using cutoff voltages of 4.0 and 1.8 V versus Li/Li$^+$.

The charge and discharge measurements were carried out by LAND CT2000 at different current densities. Asymmetric cells were charged and discharged between 2.7 and 0.1 V, and AC-based symmetric cells were charged and discharged between 2.7 and 0 V. The specific capacitance, power and energy density were calculated based on the total mass of anode and cathode materials.

Energy density is calculated using Equation 1:

$$E = \tfrac{1}{2}CV^2 \qquad \text{Eq. 1}$$

where C is the total cell capacitance and V is the maximum cell potential. For $E_{max}$ calculation, the cell potential is considered as 2.7 V for all configurations.

The charge stored by each electrode is determined by Equation 2:

$$q = C_s * m * \Delta U \qquad \text{Eq. 2}$$

where $C_s$ is the specific capacitance, $\Delta U$ the potential range for the charge/discharge process and m the mass of the single electrode. To obtain the maximum cell energy of the prototype supercapacitors, the cathode (represented by "ca") and anode (represented by "an") mass ratio was optimized according to Equation 3:

$$m_{ca}/m_{an} = (C_{an} * \Delta U_{an})/(C_{ca} * \Delta U_{ca}) \qquad \text{Eq. 3}$$

The total cell capacitance is calculated by Equation 4:

$$C = I/[-(dU/dt)*M] \qquad \text{Eq. 4}$$

where I is the discharge current density and M the total mass of anode and cathode materials.

Figure 6A:
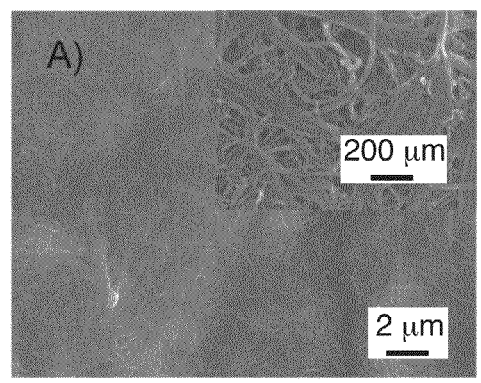
FIG. 6A is a SEM image of a representative CNT/V$_2$O$_5$ nanocomposite film containing 18 wt-% of CNTs, and the same film etched by 1 wt-% HF (insert).

FIG. 6A shows a representative scanning electron microscope (SEM) image of a nanocomposite with 18 wt-% of CNTs, demonstrating a continuous fibrous structure (insert). The intertwined networks of the CNTs and nanowires exhibit an electrical conductivity of ~3.0 S cm$^{-1}$, which is 80 times higher than that of V$_2$O$_5$ nanowires (0.037 S cm$^{-1}$).

Figure 6B:
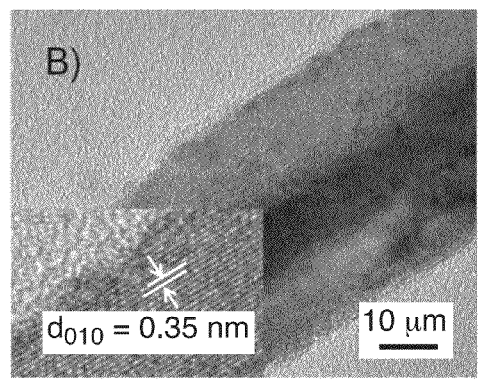
FIG. 6B shows TEM and HRTEM (inset) images of a V$_2$O$_5$ nanowire with a layered crystalline structure.
Figure 7A:
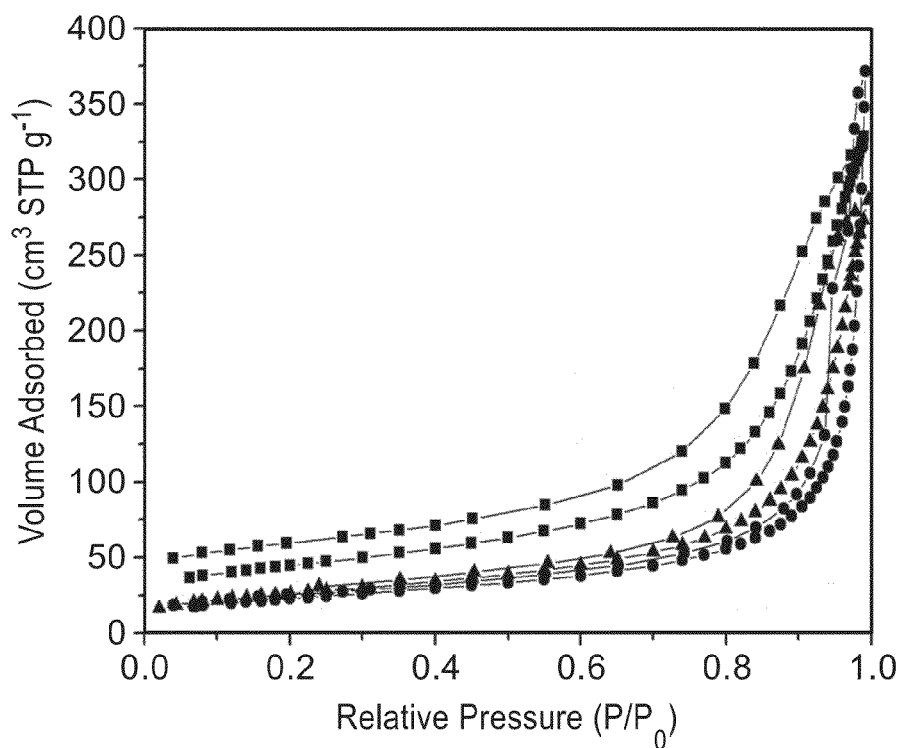
FIGS. 7A and 7B show Nitrogen sorption isotherms (A) and pore size distributions (B) of CNTs (■), V$_2$O$_5$ nanowires (●) and CNT/V$_2$O$_5$ nanocomposites (▲).
Figure 7B:
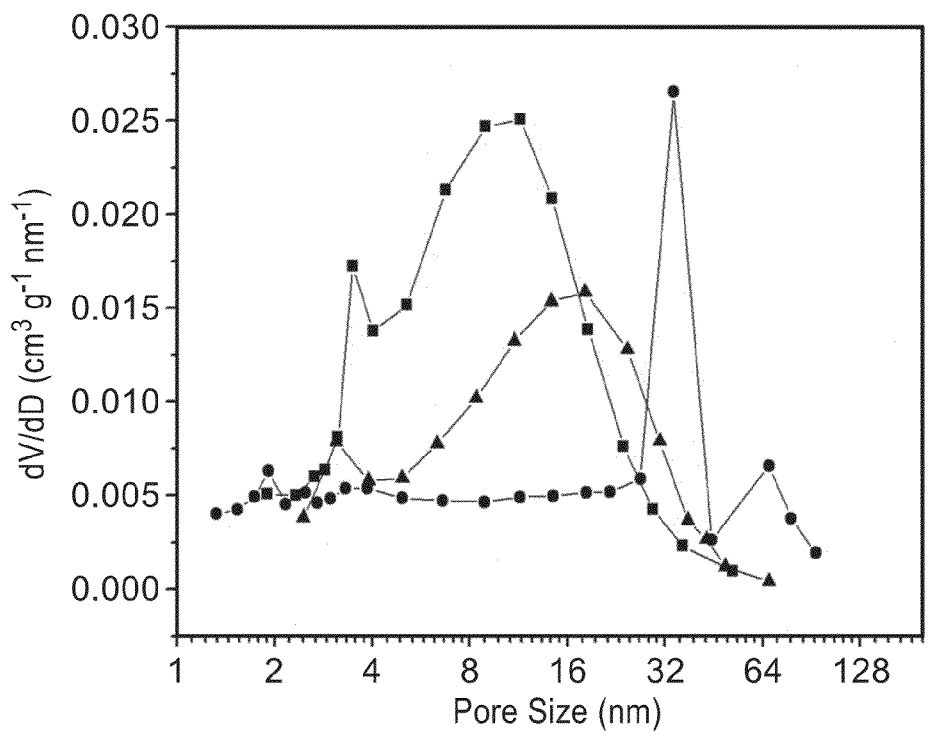

FIG. 6B shows a transmission electron micrograph (TEM) of a V$_2$O$_5$ nanowire with a diameter of around 50 nm. The high-resolution TEM (HRTEM) image (inset) suggests the nanowire contains a layered crystalline structure; the small nanowire dimension allows effective Li$^+$ diffusion. Moreover, nitrogen sorption isotherms and higher resolution SEM of the etched composite film (FIG. 6A, inset) show that the composite possesses a hierarchically porous structure (see FIG. 7A showing Nitrogen sorption isotherms and FIG. 7B showing pore size distributions of CNTs (■), V$_2$O$_5$ nanowires (●) and CNT/V$_2$O$_5$ nanocomposites (▲)). The presence of large pores enables rapid electrolyte transport while the small pores provide large area of oxide surface. The latter is responsible for the surface area of 125 m$^2$ g$^{-1}$ determined for the composite.

The electrochemical behavior of the composite was investigated using three-electrode cells, in which lithium foils were used as both the counter and reference electrodes. Charge storage behavior was characterized by cyclic voltammetry (CV). The electrochemical Li$^+$ insertion process occurring at V$_2$O$_5$ electrodes can be expressed by V$_2$O$_5$+xLi$^+$+xe$^-$ ↔ Li$_x$V$_2$O$_5$, where x is the mole fraction of inserted lithium ions.

Figure 8A:
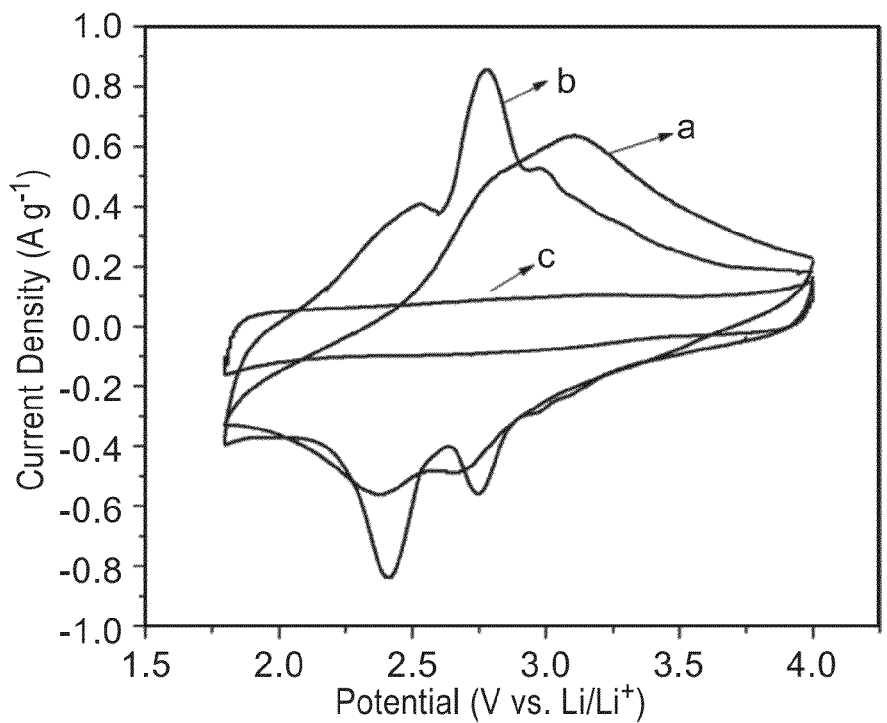
FIG. 8A is a plot of cyclic voltammograms of the electrodes made of (a) V$_2$O$_5$ nanowires, (b) CNT/V$_2$O$_5$ nanocomposite and (c) CNTs at a potential scan rate of 2 mV s$^{-1}$.

FIG. 8A compares the cyclic voltammograms of V$_2$O$_5$ nanowire (a), CNT/V$_2$O$_5$ nanocomposite (b) and CNT (c) electrodes. The nanowire electrode shows two pairs of broad, symmetric, and well-separated redox peaks, indicating sluggish lithium ion insertion/de-insertion kinetics. In contrast, the nanocomposite electrode shows two pairs of well defined redox peaks (anodic peaks at 2.8 and 3.0 V, with corresponding cathodic peaks at 2.4 and 2.7 V). The shift of anodic and cathodic peaks to the lower and higher potentials, respectively, is consistent with electrode polarization.

The improved electrode kinetics observed in the nanocomposite electrode is associated with the presence of a hierarchical pore structure and more importantly, increased conductivity. In comparing the cyclic voltammograms, it is evident that the charge storage behavior of the nanocomposite is not due to a simple addition of the current response of the CNT and nanowire electrodes. The peak potentials of the nanowire and nanocomposite electrodes are close to those reported for $V_2O_5$ aerogel- or xerogel-based thin film electrodes (anodic peaks at 2.8 V), which are much lower than those of a crystalline $V_2O_5$ electrode (anodic peaks at 3.4 and 3.2 V respectively).

To further explore the charge storage ability, all the electrodes were first charged and discharged at slow rates. At a charge/discharge time of 2000 seconds, the CNT electrode gave a capacity of 86 C $g^{-1}$ between 1.8 and 4.0 V (see FIG. 9A, which shows charge-discharge curves of a pretreated CNT electrode at a charge/discharge of 2000 seconds).

Figure 9A:
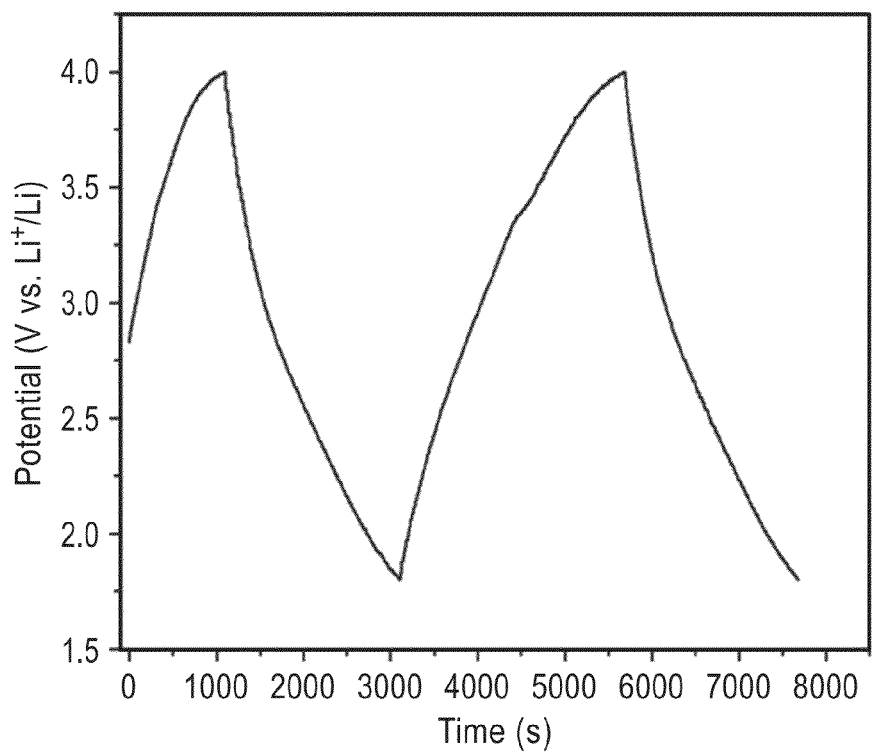
FIG. 9A shows charge/discharge curves of a pretreated CNT electrode at a charge/discharge of 2000 seconds.
Figure 9B:
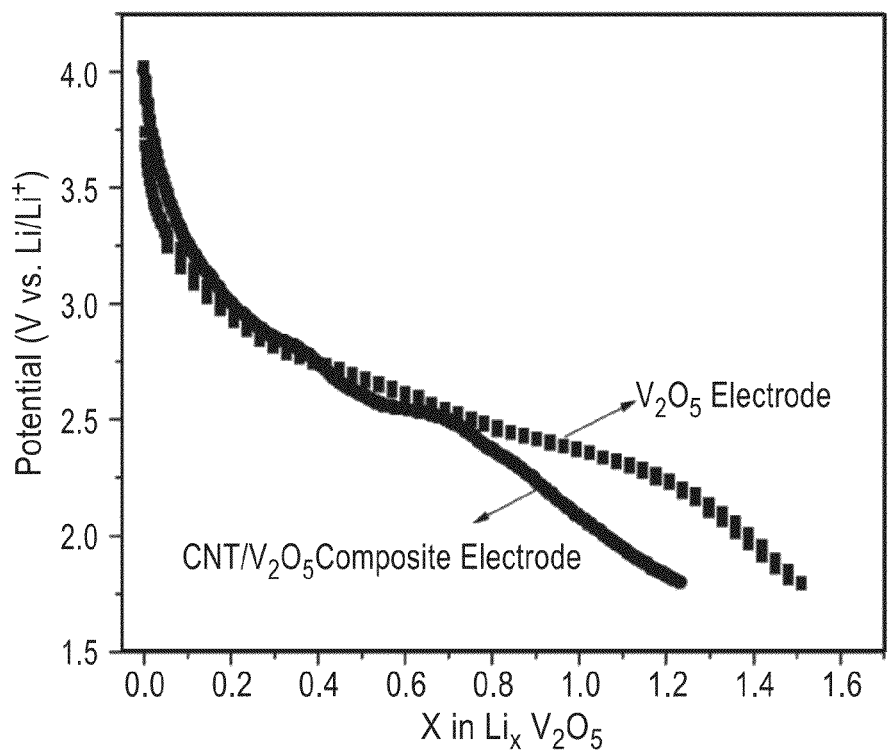
FIG. 9B shows lithium insertion into V$_2$O$_5$ nanowire and nanocomposite electrodes at a C/4 rate.

For the nanowire electrode, at a charge/discharge time of 4 hours (C/4 rate), the electrode provided a total charge storage of 792 C $g^{-1}$, which corresponds to a specific capacity of 220 mAh $g^{-1}$ (see FIG. 9B, which shows lithium insertion into $V_2O_5$ nanowire and nanocomposite electrodes at a C/4 rate). This value is comparable to that of crystalline $V_2O_5$ prepared at higher temperatures. Considering that 18 wt-% of CNTs were incorporated into the composite, the nanocomposite electrode should exhibit a capacity of 663 C $g^{-1}$ by simply adding the capacity contribution of each constituent. This behavior was observed in galvanostatic experiments which showed that the nanocomposite electrode exhibited a capacity of 650 C $g^{-1}$ indicating that each constituent contributes independently to the total charge storage at slow charge and discharge rates.

Figure 8B:
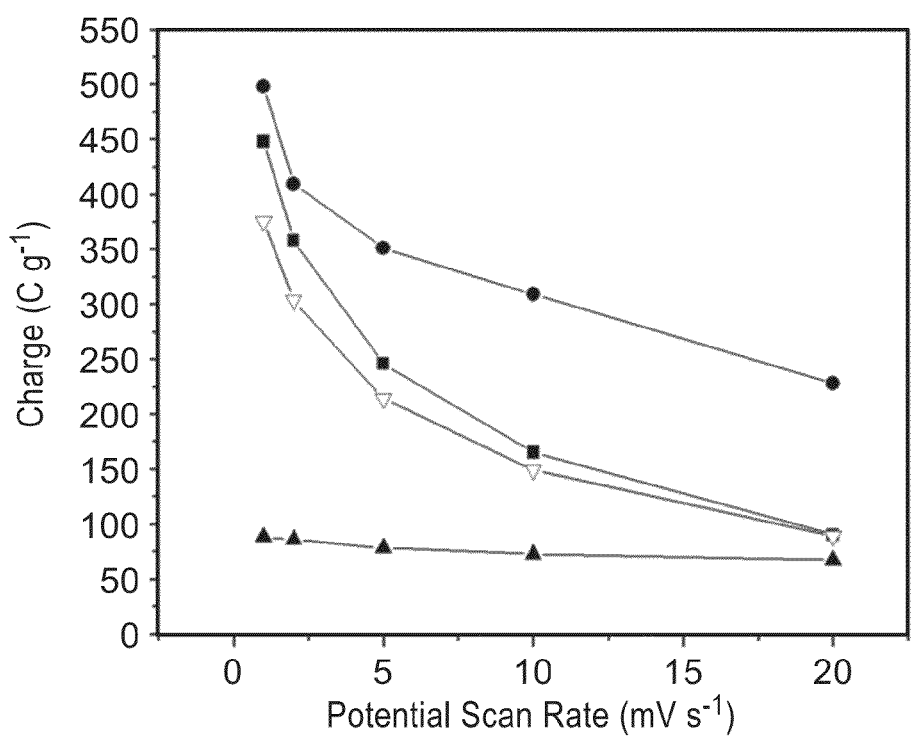
FIG. 8B is a plot showing the comparison of the rate capability of V$_2$O$_5$ nanowires (■), CNT/V$_2$O$_5$ nanocomposite (●), CNTs (▲) based electrodes, and total charge storage by simply adding the capacity contribution of each constituent of the composite electrode (▽).
Figure 10:
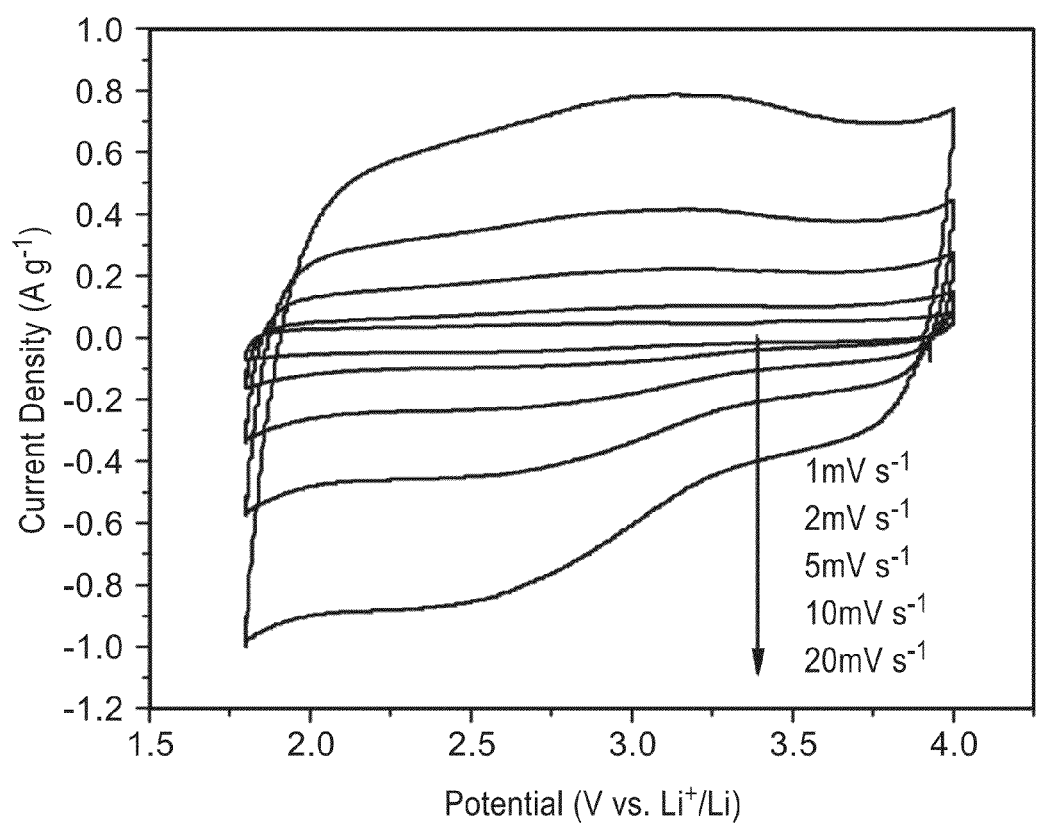
FIG. 10 shows cyclic voltammograms of electrodes made of pure pretreated CNTs.

In characterizing the rate capability of the nanocomposite electrode, CVs were carried out at different sweep rates with the areas under the curves used to determine the total electrode capacity. FIG. 8B compares the charge storage of $V_2O_5$ nanowire (■), CNT (▲), and CNT/$V_2O_5$ nanocomposite (●) electrodes at sweep rates ranging from 1 to 20 mV $s^{-1}$ (equal to charge/discharge times from 2200 to 110 s, respectively). As expected, the CNT electrode shows very high rate capability but low capacitance as there is only capacitive storage arising from the electrical double-layer (see FIG. 10, showing cyclic voltammograms of electrodes made of pure pretreated CNTs). At 1 mV $s^-$, the CNT and nanowire electrodes show capacities of 85 and 448 C $g^{-1}$, respectively. Simply adding the capacity contribution of each constituent at this sweep rate would give a capacity of 383 C $g^{-1}$, which is significantly lower than that measured for the composite electrode (498 C $g^{-1}$, x=0.89).

Interestingly, the measured capacity of the nanocomposite electrode is even higher than that of the pure $V_2O_5$ nanowire electrode, suggesting that the addition of the CNTs leads to improved charge transfer for the $V_2O_5$ nanowires (See FIGS. 16A and 16B below). This effect becomes more pronounced at higher scan rates. At 20 mV $s^{-1}$, the $V_2O_5$ nanowire electrode exhibits only 20% (90 C $g^{-1}$) of the capacity measured at 1 mV $s^{-1}$. In contrast, the CNT/$V_2O_5$ nanocomposite electrode exhibits substantially higher capacity (228 C $g^{-1}$) at 20 mV $s^{-1}$, which is nearly 50% of its value at 1 mV $s^{-1}$. This high rate capability is consistent with the notion that the CNTs effectively 'wire' the $V_2O_5$ to provide enhanced electronic conductivity, leading to increased rates of charge transfer, thus making these materials of potential interest for supercapacitor applications.

It should be noted that the intercalation of $Li^+$ into the $V_2O_5$ solid phase is intrinsically slow, with a reported diffusion coefficient on the order of $10^{-13}$ $cm^2$ $s^{-1}$. The maximum diffusion length of $Li^+$ at the time scale of 100 s is approximately 45 nm, which is close to the diameter of the $V_2O_5$ nanowires. However, our voltammetry results with the $V_2O_5$ nanowires show that insertion of one equivalent of lithium per vanadium requires a time scale longer than 2200 s. The poor rate capability observed for the nanowire electrode can arise from poor charge transfer. The low electrical conductivity of a thick electrode ($\sigma \approx 10^{-5}$-$10^{-3}$ $\Omega^{-1}cm^{-1}$) results in large uncompensated ohmic drops during fast charging and discharging. Intimately intertwining the nanowires with the highly conductive CNTs leads to composite electrodes which support high rate capability without compromising high energy density.

Figure 11A:
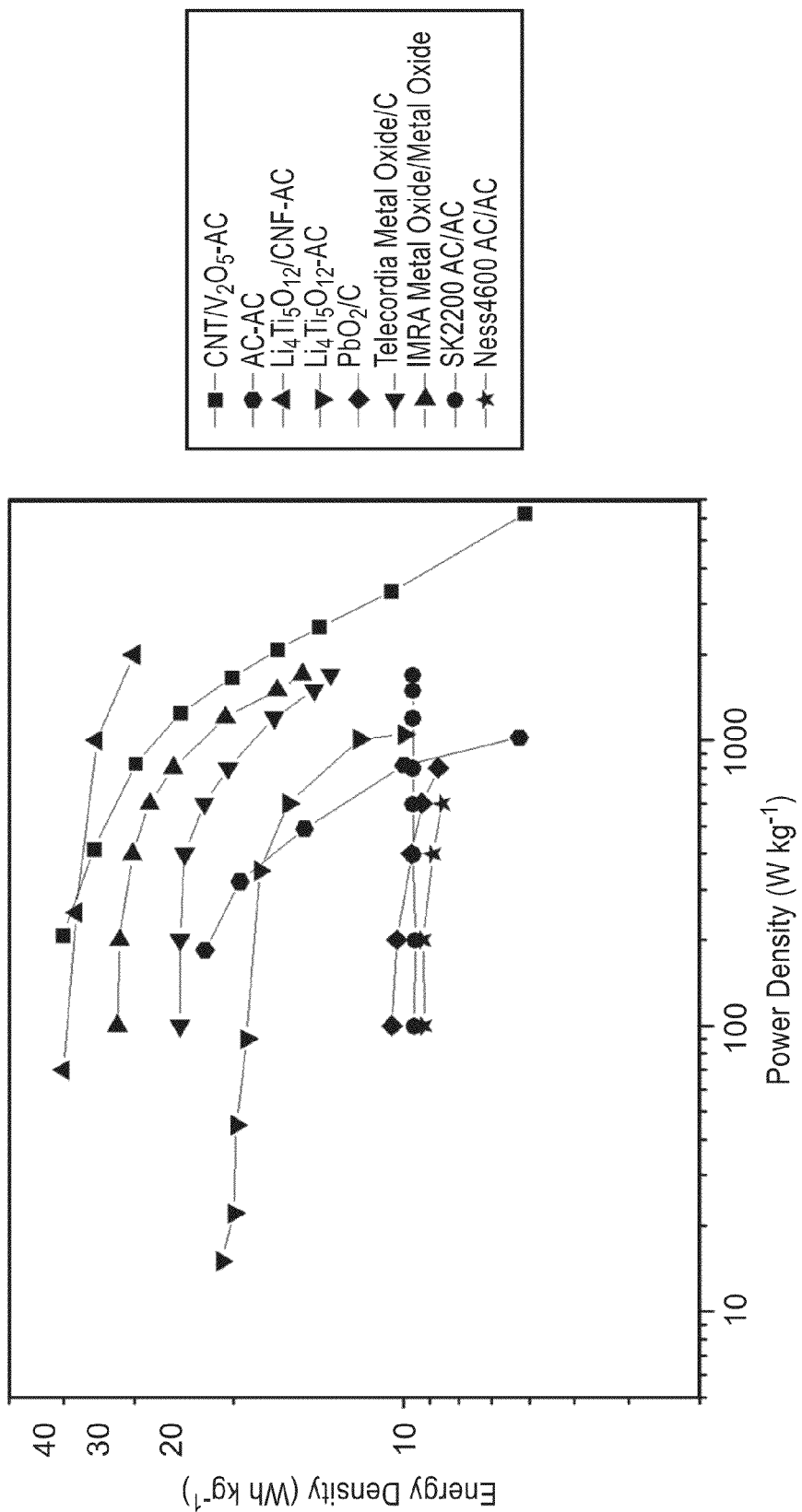
FIG. 11A shows Ragone plots of an asymmetric supercapacitor made from an AC cathode and CNT/V$_2$O$_5$ nanocomposite anode, a symmetric supercapacitor made from the same AC, and various supercapacitor types
Figure 12:
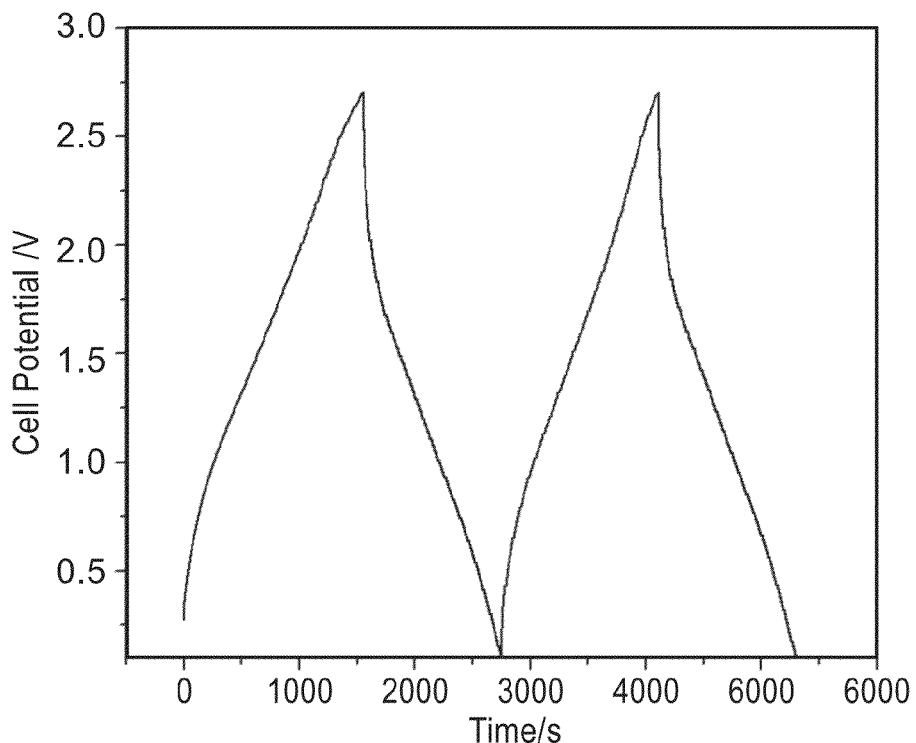
FIG. 12 shows constant current charge/discharge curves for an asymmetric CNT/V$_2$O$_5$-AC supercapacitor in accordance with the present invention.

Asymmetric supercapacitors using the CNT/$V_2O_5$ nanocomposite as an anode 34 and a commercial AC as the cathode material 32 were assembled to assess the feasibility of using the composites for actual device fabrication. FIG. 11A compares the Ragone plots derived from constant-current charge/discharge characteristics for different prototype supercapacitors, along with symmetric supercapacitors made from AC. FIG. 12 shows constant current charge/discharge curves for an asymmetric CNT/$V_2O_5$-AC supercapacitor in accordance with the present invention. The devices were discharged and charged at a power density of 210 W $kg^{-1}$.

For the asymmetric device made from the nanocomposite anode 34, using a discharge current density of 0.5 mA $cm^{-2}$ (corresponding to a power density of 210 W $kg^{-1}$) we obtain an energy density of 40 Wh $kg^{-1}$. Even at a power density of 6300 W $kg^{-1}$ (charge and discharge time of 4 s), the device still possesses an energy density of 6.9 Wh $kg^{-1}$, an indication of its high-power performance. The energy and power performance of this asymmetric supercapacitor 30 is competitive with that of graphitic carbon, $Li_4T_5O_{12}$ or other metal oxide based hybrid systems, and represents a significant improvement over the current state-of-the-art electric double-layer capacitor (EDLC) technology. Also shown here are recent results for CNF-grafted nano-crystalline $Li_4T_5O_{12}$-based hybrid supercapacitors. The improvement in energy and power density compared to other $Li_4T_5O_{12}$ electrodes is due to the increased electrical conductivity.

As explained above, the energy density of a supercapacitor is governed by the overall capacitance (C) and the operating voltage (V). Assuming a fixed potential window of 2.7 V (a typical operating voltage for supercapacitors using organic electrolytes) and a specific capacitance for the AC cathode of 100, 120 or 150 F $g^{-1}$, the maximum energy densities ($E_{max}$) of the capacitors can be calculated by adjusting the mass ratio of the cathode and anode to achieve a balanced charge on both electrodes.

Figure 11B:
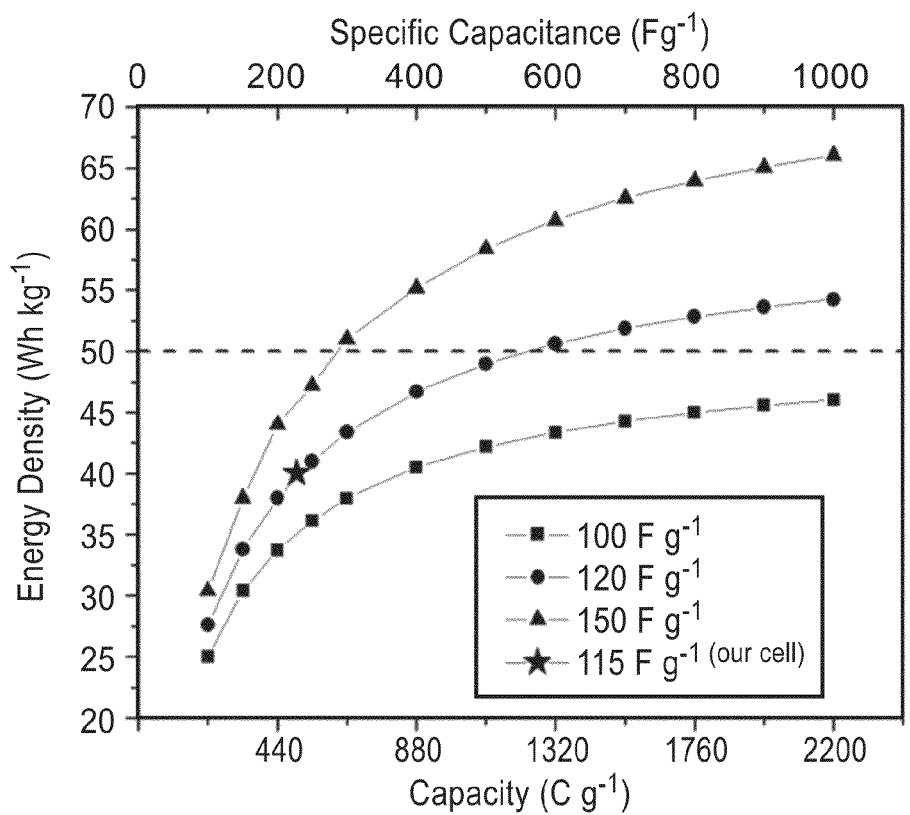
FIG. 11B shows the calculated maximum energy density vs. the anode capacitance at a cathode capacitance of 100, 120 and 150 F g$^{-1}$, respectively, at a cell voltage of 2.7 V.

FIG. 11B plots the $E_{max}$ vs. the specific capacitance of the anode for the different cathode capacitances. The results indicate that an increase in $E_{max}$ occurs with increasing specific capacitances for both electrodes. However, for a device built with a carbon cathode of specific capacitance less than 100 F $g^{-1}$, $E_{max}$ is below 50 Wh $kg^{-1}$ irrespective of how much charge can be stored in the anode. In the devices of the present invention, the specific capacitances of the cathode and anode are considered to be 115 F $g^{-1}$ and 288 F $g^{-1}$, respectively, leading to a theoretical $E_{max}$ of 42 Wh $kg^{-1}$. This value is in good agreement with the energy density measured (40 Wh $kg^{-1}$) for asymmetric supercapacitor of the present invention. In order to boost the energy density to 50 Wh $kg^{-1}$, the specific capacitance of the cathode is increased, or the operating potential window is broadened.

Figure 11C:
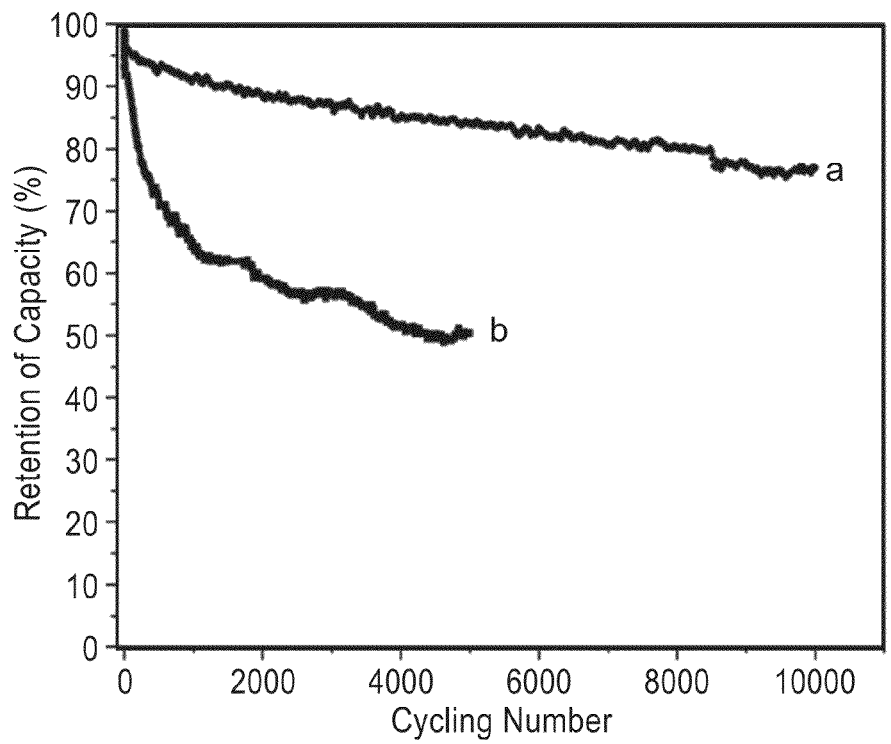
FIG. 11C is a plot of the long-term cycling performance of the asymmetric devices of the present invention based on (a) a nanocomposite anode and AC cathode and (b) a nanowire anode and AC cathode operated at cell potential of 2.7 V.

In addition to demonstrating high energy density and high power, the asymmetric devices based on the CNT/V$_2$O$_5$ nanocomposite electrode 40 also exhibit excellent cycling properties. FIG. 11C shows the cycling behavior for asymmetric devices that use either a composite anode or a V$_2$O$_5$ nanowire anode. The device with the CNT/V$_2$O$_5$ nanocomposite electrode (a) retained ~80% of the initial energy density after 10,000 cycles at a 30 C charge/discharge rate (power density of 820 W kg$^{-1}$), while the nanowire-based device (b) retained only ~50% of its initial energy density after 5,000 cycles. The long cycling life observed for the nanocomposite electrode is attributed to the unique intertwined CNT/nanowire structure.

It has been commonly observed that nano-dimensional materials, such as MnO$_2$ nanoparticles, may lose most of their initial capacitance during cycling, mainly due to agglomeration and reduced surface area exposed to the electrolyte. For the V$_2$O$_5$ nanowire electrode, the observed degradation in capacity may be attributed to a similar mechanism. However, the formation of intimately intertwined CNT/nanowire networks effectively provides the composite electrode with structural integrity, as agglomeration is suppressed and long-term charge storage is achieved.

In summary, we have designed and fabricated asymmetric supercapacitors based on using a thick-film CNT/V$_2$O$_5$ nanowire composite anode and commercial AC-based cathode in combination with an organic electrolyte. The nanocomposite electrode exhibits excellent rate capability, high capacity and cycling stability. The asymmetric supercapacitor of the present invention showed an energy density of 40 Wh kg$^{-1}$ at a power density of 210 W kg$^{-1}$, and a maximum power density of 20 kW kg$^{-1}$. The overall energy and power performance of such an asymmetric cell is superior to the current technology based on electric double layer capacitors (EDLCs). The improvement in energy density without compromising power density suggests that this asymmetric nanocomposite supercapacitor of the present invention may be used for a wide range of device applications. The nanocomposite of the present invention is also suitable for the design and fabrication of new types of higher-energy and high-power electrochemical devices using heterogeneous nanocomposite materials.

III. Electrode Configuration

Figure 16A:
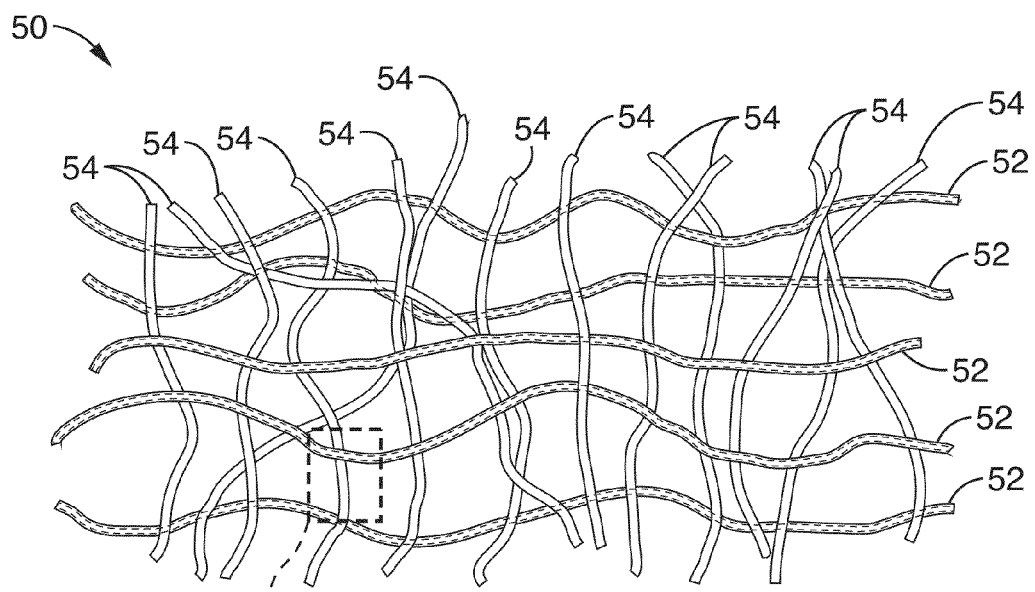
FIG. 16A is a schematic representation of a nanocomposite electrode structure according to certain embodiments of the present invention, and based on interpenetrating networks of CNTs and V$_2$O$_5$ nanowires.
Figure 16B:
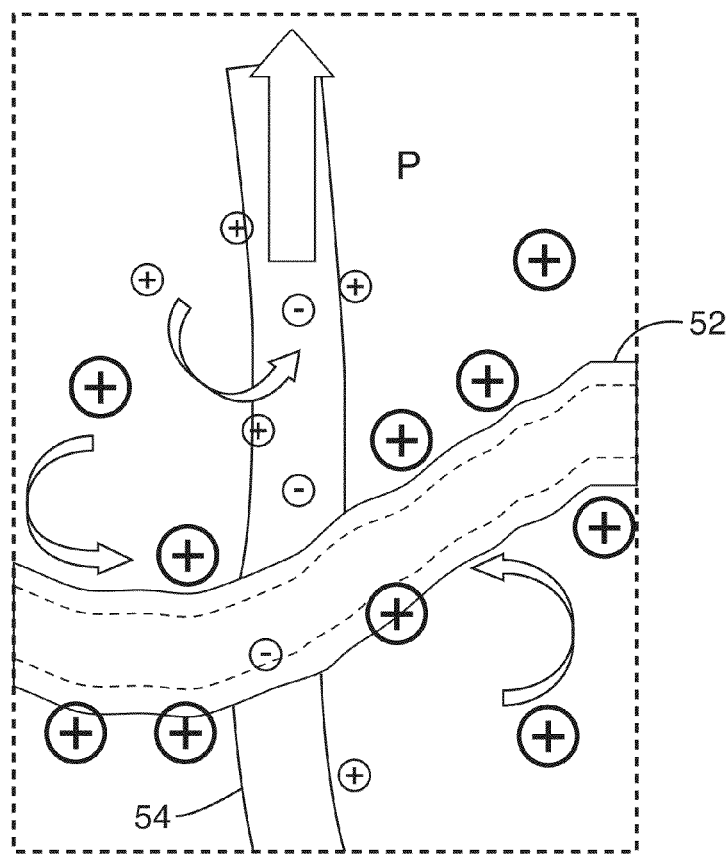
FIG. 16B is an expanded view of the nanocomposite structure of FIG. 16A.

Referring to FIGS. 16A and 16B, a novel supercapacitor electrode according to an embodiment of the present invention is comprised of a composite mesh 50 of interpenetrating CNTs 54 and V$_2$O$_5$ nanowires 52. This unique architecture is particularly advantageous in supercapacitor applications, for example where: 1) the small dimension of the CNTs 54 and the V$_2$O$_5$ nanowires 52 provide high surface areas, leading to a high EDLC and better utilization of the V$_2$O$_5$ active sites (higher specific pseudocapacitance); 2) the interpenetrating CNT/V$_2$O$_5$ nanowire structure 50 creates hierarchical porous channels, enabling effective electrolyte transport and active-site accessibility; 3) the V$_2$O$_5$ nanowires 52 are intimately intertwined with highly conductive CNTs 54, facilitating a faster electron transport and efficient current collection.

In FIG. 16B, the (+) symbols illustrate cations (positively charged ions, e.g. Li+ or Na+) in electrolyte, which would react with V$_2$O$_5$ nanowires 52. The (−) illustrate electrons that are produced by such reaction can be transferred very easily by the conductive CNT 54 pathways P.

In certain exemplary embodiments according to the present invention, novel CNT/V$_2$O$_5$ nanowire composites were synthesized using a one-pot hydrothermal approach. Briefly, multi-wall CNTs were firstly modified to attach carboxylic groups on the surface. Hydrothermal reaction of vanadium-oxide precursors in the presence of the modified CNTs led to the formation of the aforementioned composites.

Figure 17A:
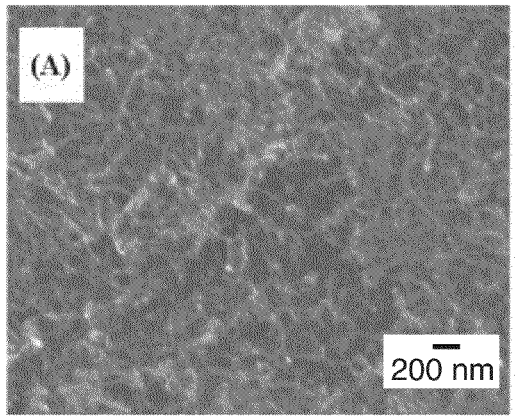
FIGS. 17A and 17B are (A) scanning electron microscope (SEM) and (B) transmission electron microscope (TEM) images of modified CNTs according to certain embodiments of the present invention.
Figure 17B:
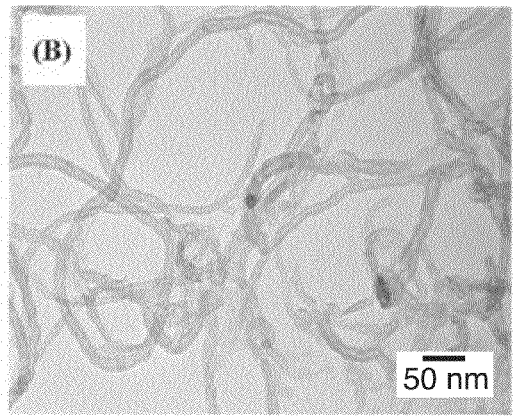
Figure 17C:
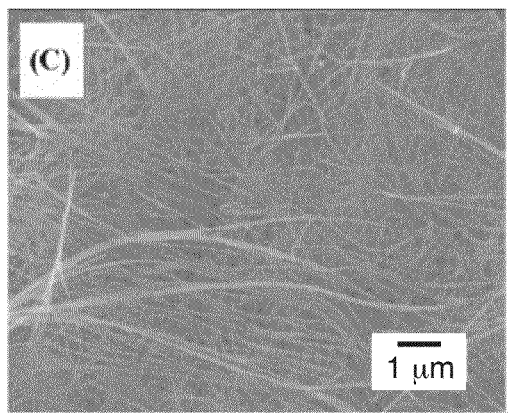
FIGS. 17C and 17D are (C) SEM and (D) TEM images and selective area electron diffraction (SAED) (insert) of $V_2O_5$ nanowires according to certain embodiments of the present invention.
Figure 17D:
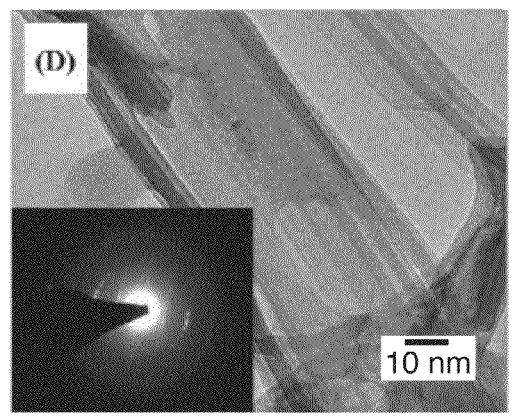
Figure 17E:
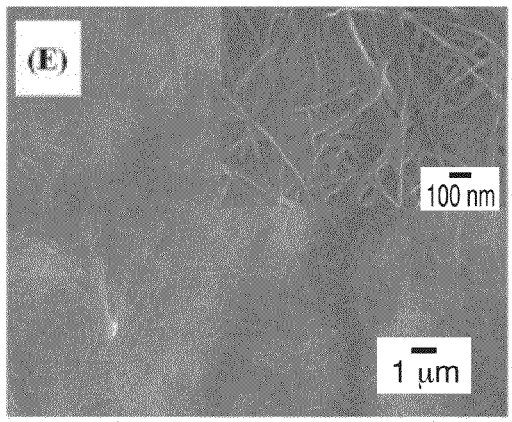
FIGS. 17E and 17F are SEM images of CVC-2 (E) before and (F) after etching, which show an interpenetrating structure.
Figure 17F:
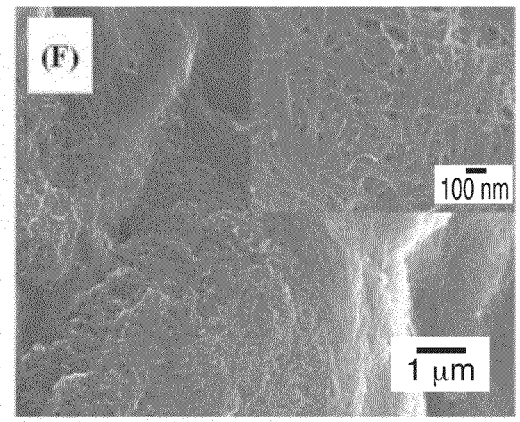

Referring to FIGS. 17A-17F, scientific analysis has confirmed the novel structure and morphology of the nanowire composites of the present invention. FIGS. 17A and 17B show representative (A) SEM and (B) TEM images of the CNTs in an exemplary embodiment, revealing a porous network of entangled CNTs with diameters around 20-30 nm and lengths up to micrometers. Similarly, the diameter of the V$_2$O$_5$ nanowires in this exemplary embodiment is around 20-50 nm and length is up to tens of micrometers (SEM image, FIG. 17C). A high resolution TEM image (FIG. 17D) shows that the V$_2$O$_5$ nanowires contain an ordered layered structure; selective area electron diffraction (SAED) pattern (Inset, FIG. 17D) suggests that they are single crystalline. In-situ growth of the V$_2$O$_5$ nanowires within the porous CNT networks led to the formation of flexible, dark-brown nanocomposites (FIG. 11A), of which the V$_2$O$_5$ nanowire loading was engineered by tuning the ratio of CNTs to the V$_2$O$_5$ precursor used. FIG. 17E shows an SEM image of a representative composite with 30 wt-% of CNTs (CVC-2), showing a continuous fibrous structure with pores up to microns in diameter.

Figure 18A:
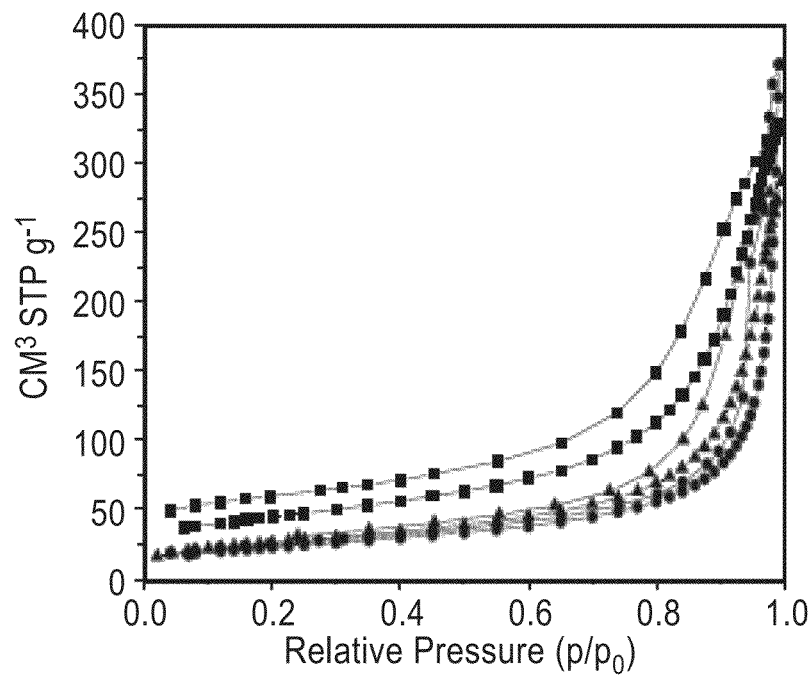
FIGS. 18A and 18B are (A) nitrogen sorption isotherms and (B) pore size distributions of CNTs (■), V2O5 nanowires (●) and CVC-2 (▲).
Figure 18B:
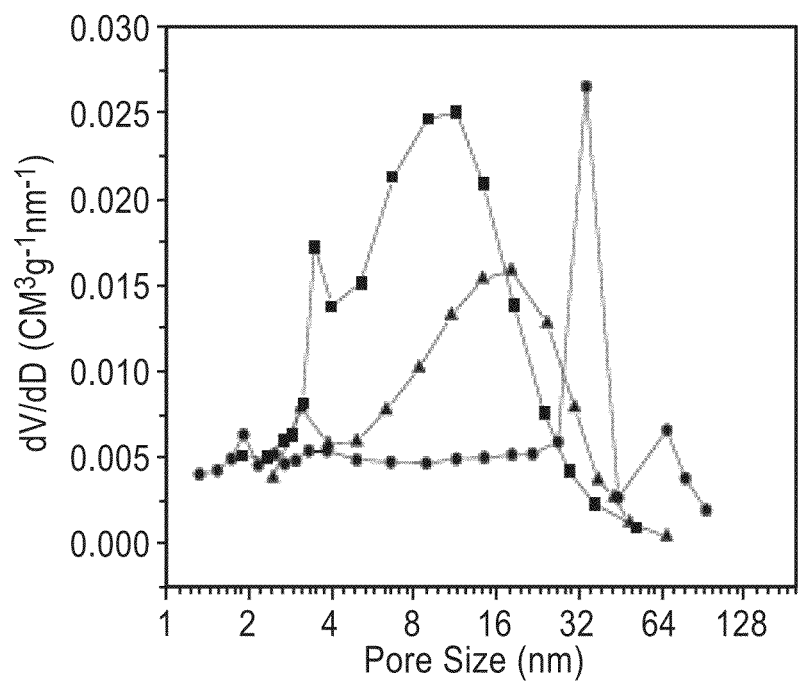

Referring to FIGS. 18A and 18B, FIG. 18A shows nitrogen sorption isotherms of the CNTs, V$_2$O$_5$ nanowires and CVC-2, all of which are similar in shape. The CNTs show a surface area of 150 m$^2$/g, pore volume of 0.488 cm$^3$/g, and an average pore diameter of 12.5 nm (FIG. 18B). The V$_2$O$_5$ nanowires show a lower surface area of 83 m$^2$/g, larger pore diameter of 26.7 nm, and a pore volume 0.552 cm$^3$/g. The CVC-2 exhibits a comparable surface area of 125 m$^2$/g and average pore size of 15.2 nm, evidencing that the composite is hierarchically porous. The composites with different CNT loadings display a similar porous fibrous structure (FIGS. 12A-12C, Table 1); the morphology of the composites with high CNT content is generally less uniform with more CNTs exposed on the surface. This hierarchical structure can be advantageous (e.g., compared with strictly mesoporous structures of the prior art) in ensuring good capacitance performance, since the large pore channels (e.g., macropores) allow rapid electrolyte transport; while the small ones (e.g., micropores) provide the composites with higher surface areas and more surface active sites. In certain embodiments of the present invention, substantially all pores have diameters less than 20 nm or greater than 100 nm.

Figure 18C:
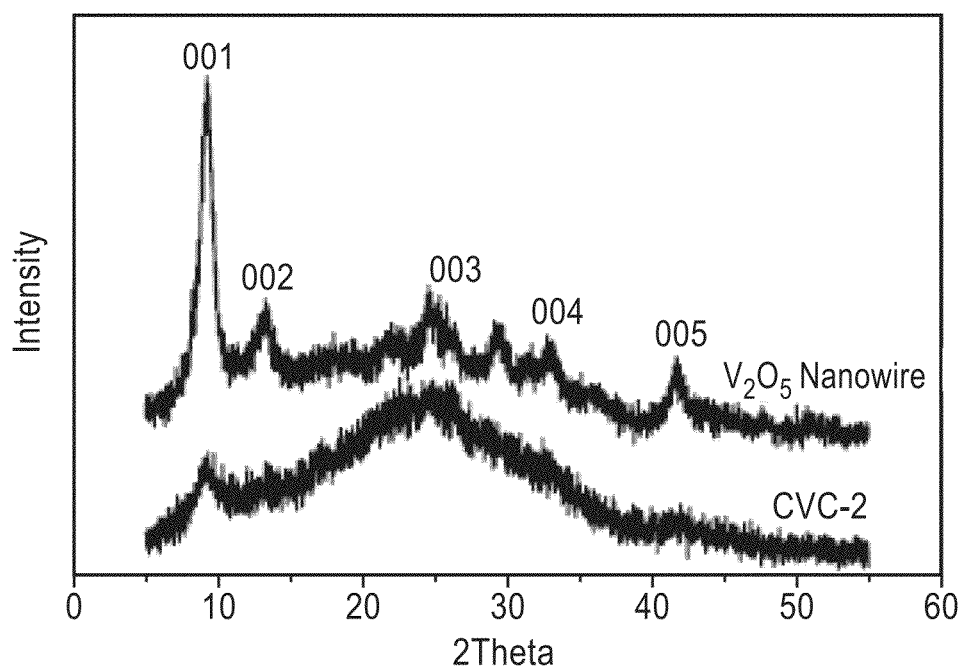
FIG. 18C is a graph showing XRD patterns of $V_2O_5$ nanowires and the CVC-2 composite.

Referring to FIG. 18C, in-situ growth of the V$_2$O$_5$ nanowires within the CNT network leads to an interpenetrating nanowire network structure. X-ray diffraction (XRD) indicates that the free-growth V$_2$O$_5$ nanowires are highly crystalline with well-defined (001) reflections at two-theta degree of 9.1, 13.5, 25.5, 32.5 and 42.0, consistent with the lamellar structure shown in the FIG. 2D. The CVC-2 composites show similar reflections but with significantly lower intensity, indicating the nanowires grown within the composites may contain smaller crystalline domains. Partial removal of the V$_2$O$_5$ nanowires using 1% HF solution exposed the constituent CNT networks on the composite surface (FIG. 2F), further confirming the interpenetrating network structure. This interpenetrating network structure creates intimate contact between the nanowire networks (e.g., CNT network and V$_2$O$_5$ nanowire network) enabling rapid charge transport to the current collector through the highly conductive CNT network. Representative CVC-2 composite electrodes registered a DC conductivity of 1.2×10$^{-2}$ S/cm (a nearly 40× improvement over that of representative V$_2$O$_5$ electrodes, which registered a DC conductivity of only 3.1×10$^{-4}$ S/cm). Note: the electrical conductivity of composite electrodes according to embodiments of the present invention may be engineered through, for example, material selection (e.g., type of electrically conductive nanowires) and loading level; those skilled in the art will recognize that maximizing electrical conductivity may not result in optimal supercapacitor electrode performance (e.g., lower loading of electrically conductive nanowires may provide adequate electrical conductivity, while allowing increased loading of metal oxide nanowires).

Figure 19:
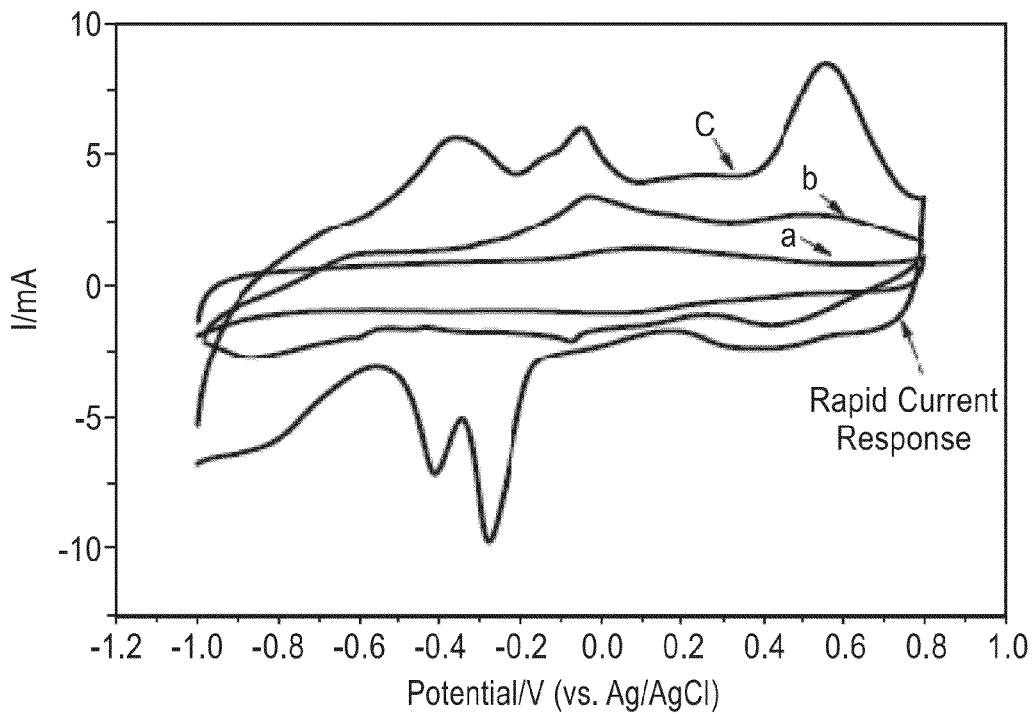
FIG. 19 is a graph showing cyclic voltammograms (CVs) of (a) CNTs, (b) $V_2O_5$ nanowires and (c) CVC-2 electrodes at a scanning rate of 10 mV/s in 1 M $Na_2SO_4$ aqueous solution at room temperature.

Referring to FIG. 19, the unique hierarchical architecture characterized by certain embodiments of the present invention endows the composites with high capacitance and rate capability. FIG. 19 shows cyclic voltammograms (CVs) of the CNT, $V_2O_5$ nanowire, and CVC-2 electrodes. The CNT electrode shows vague peaks at 0.12V and 0.05V, which can be attributed to the anodic oxidation and cathodic reduction of the surface carboxyl groups. The $V_2O_5$ nanowire electrode show two broad peaks of anodic oxidation (0.50 and −0.05 V) and reduction (0.35 and −0.10 V), which are typical for the crystalline $V_2O_5$ nanowires. For comparison, the composite electrode shows a rectangular-shape CV curve with a much larger area indicating a much higher capacitance. Furthermore, the redox peaks (anodic peaks at 0.51, −0.10-0.40 V, cathodic peaks at 0.37, −0.28, −0.42) are much better defined, suggesting a more pronounced contribution of redox capacitance to the overall capacitance. Such three-redox pairs are rare in a $V_2O_5$—$Na_2SO_4$ aqueous electrolyte system, which may be due to the ion (e.g., Na+) insertion and de-insertion reactions at different energy states. Moreover, as shown by curve C in FIG. 19, the current of the nanocomposite electrode responds to the switching potential rapidly, particularly at the potential switching point of 0.8 V, indicating the composite electrode exhibits a lower equivalent series resistance (ESR) than that of the $V_2O_5$ nanowire electrode. A small ESR is vital to achieve a high rate capability and power density, since the maximum power density ($P_{max}$) of a capacitor is generally determined by $P_{max}=V_i^2/4R$, where $V_i$ is the initial voltage and R is the ESR from electrode materials, electrolyte, and the contact resistance between electrode and current collector.

Figure 20:
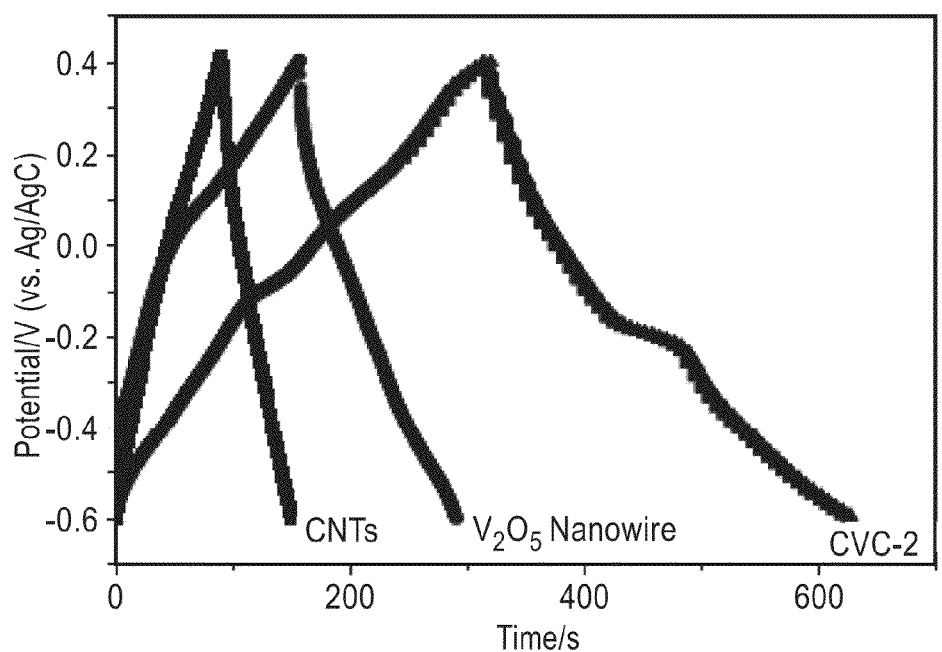
FIG. 20 is a graph showing galvanostaic charge-discharge curves of CNTs, $V_2O_5$ nanowires and CVC-2 electrodes at a charge-discharge current density of 1 Ng.

Referring to FIG. 20, galvanostaic charge-discharge curves were measured in the same working cells to further quantify their specific capacitances. FIG. 20 shows the charge-discharge curves of the CNT, $V_2O_5$ nanowire and CVC-2 electrodes at the current density of 1 Ng. The CNT electrode shows nearly linear charge and discharge curve, an indication of an ideal EDLC behavior with a specific capacitance of 75 F/g. The $V_2O_5$ nanowire electrode shows similar charge-discharge curves with a slightly increased curvature, indicating that EDLC is still the primary contribution to the overall capacitance, which is 146 F/g. Note that $V_2O_5$ may provide a pseudocapacitance as high as 530 F/g, and poor conductivity of the $V_2O_5$ nanowires may attribute to the poor use of its pseudocapacitance. Intimately weaving these poorly conductive $V_2O_5$ nanowires with the highly conductive nanowires (e.g., CNTs) into the composites led to dramatic increased capacitances. Indeed, the charge-discharge plots of the composite electrode displays a pronounced transition between the two linear ranges, indicating the capacitance is contributed from both EDLC and pseudocapacitance. The specific capacitance calculated is around 313 F/g, which is significantly higher than that of the CNTs (75 F/g) and the $V_2O_5$ nanowires (146 F/g). Since the surface area of the composite (125 m$^2$/g) is less than that of the CNTs (150 m$^2$/g), such a high capacitance can be attributed to the synergic effect of the composite constituents with the unique hierarchical structure. Considering the energy density of a capacitor is generally determined by $E=CV_i^2/2$, where C is the capacitance, composites with high capacitance are of great interest for high-energy-density device applications.

Figure 21A:
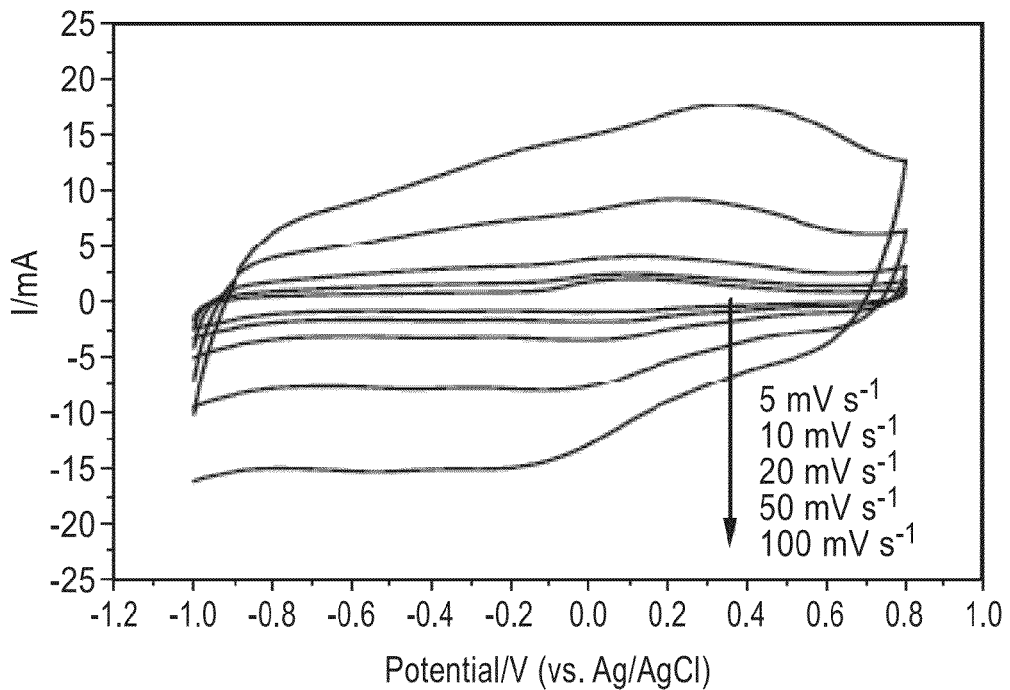
FIGS. 21A, 21B and 21C are graphs showing CV curves of (A) CNTs, (B) $V_2O_5$ nanowires and (C) CVC-2 electrodes at various potential scanning rates from 5 to 100 mV/s in 1 M $Na_2SO_4$ aqueous solution at room temperature.
Figure 21B:
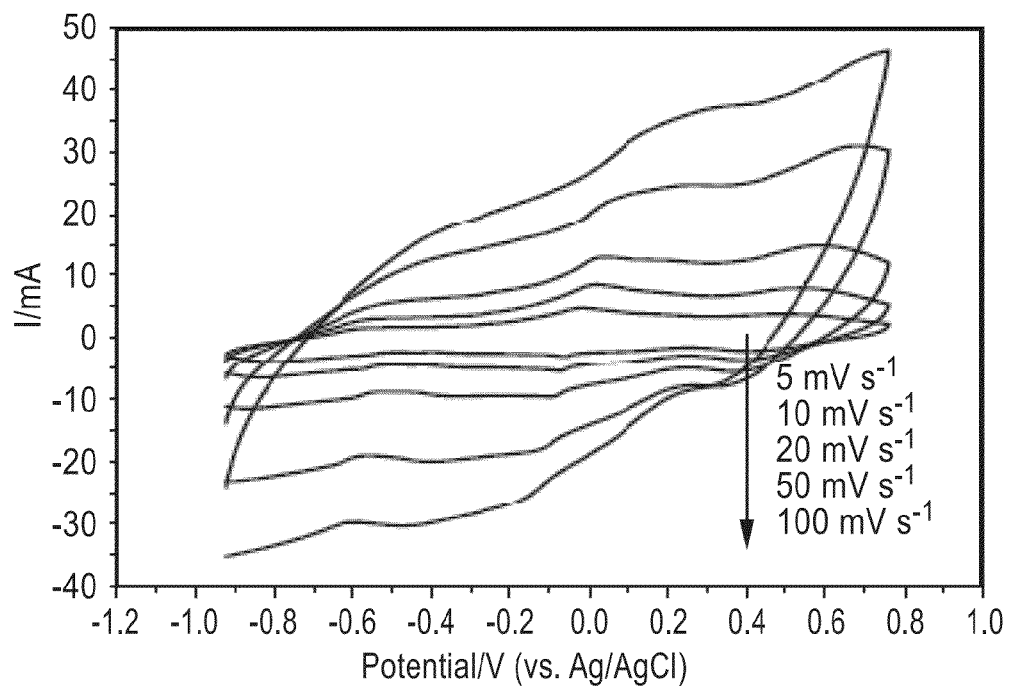
Figure 21C:
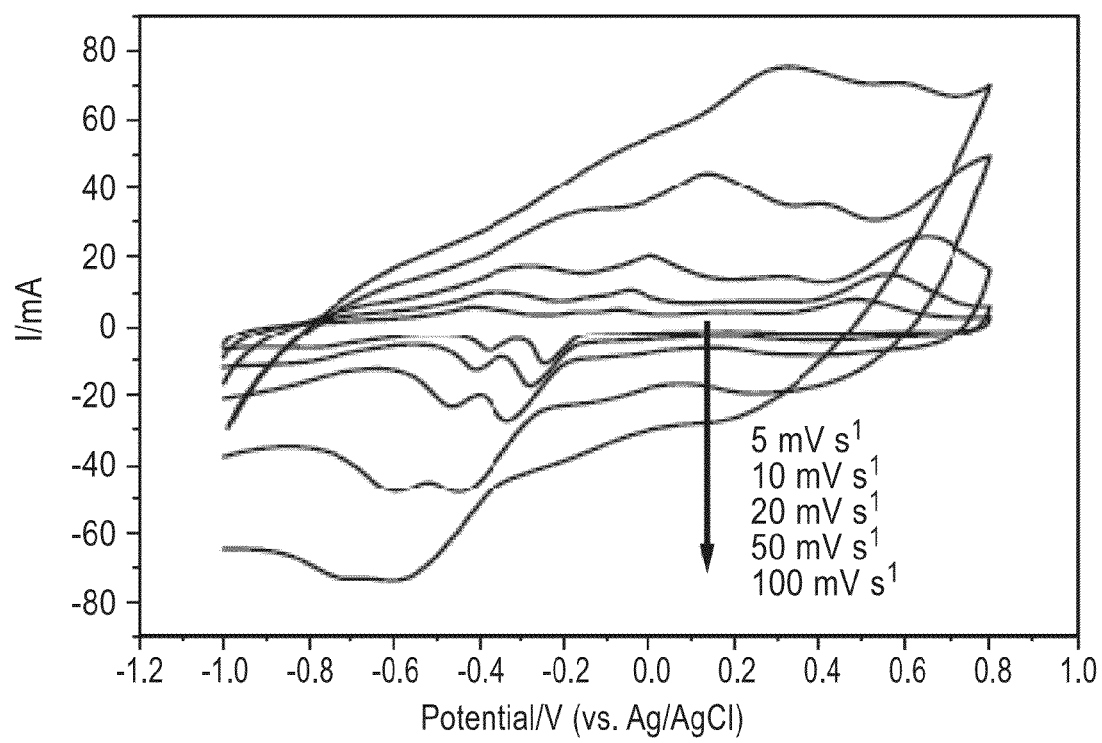

Referring to FIGS. 21A-21C, to further quantify their rate performance, CV studies at different scanning rates (5 to 100 mV s$^{-1}$) were conducted with CNTs and CVC-2 electrodes. Due to its excellent conductivity and porous structure, the CNT electrode shows excellent power performance, evidenced by the rectangular shape of its CV curves at the high scanning rates (see FIG. 21A).

Consistent with its poor conductivity, the $V_2O_5$ nanowire electrode shows a poor rate capability evidenced by its highly-distorted CV curves at high scanning rates (FIG. 21B). As expected, CV curves of the composite electrode CVC-2 maintain their rectangular shape even at high scanning rates (FIG. 21B), which is more pronounced for the composites with higher content of CNTs. Compared with the CV curves of the CNT electrode, the slight shape distortion is due to the overlapping effect of the two different energy-storage mechanisms, nevertheless, the data fully confirms the excellent rate performance of the composites of the present invention. The unique composite structure integrates the high rate performance of the CNT constituent with the high capacitance of the $V_2O_5$ nanowire constituent, leading to the synergic energy storage materials. Nevertheless, CNTs have low energy density whereas $V_2O_5$ nanowires have poor rate performance; extensive engineering of the composition was therefore essential to achieve high capacitance performance.

Figure 22:
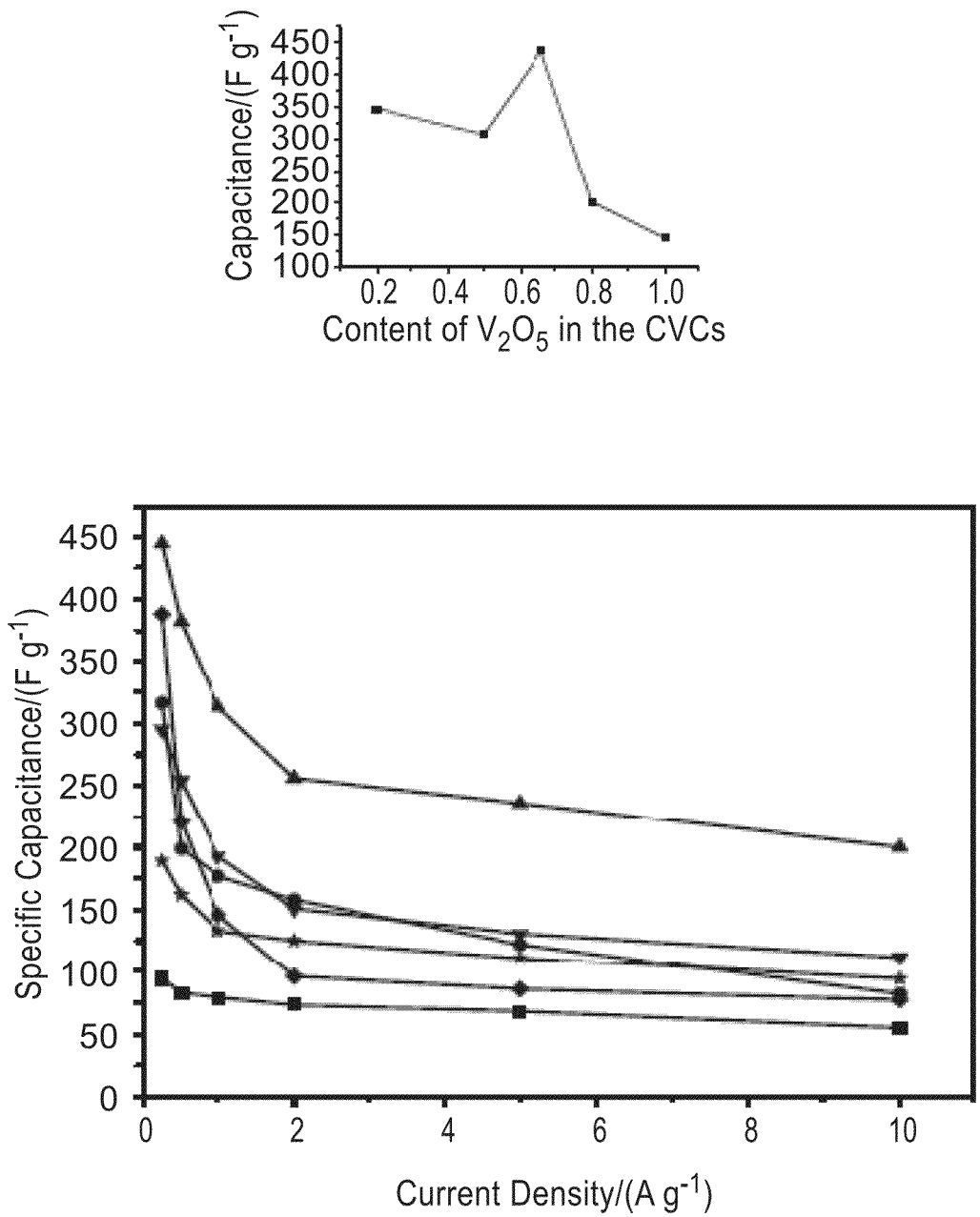
FIG. 22 is a graph showing the gravimetric capacitance of the composite electrodes with different CNT contents at different current densities: CNT electrode (■), $V_2O_5$ nanowire electrode (♦), CVC-1 (●), CVC-2 (▲), CVC-3 (▼) and CVC-4 (★).

Referring to FIG. 22, the CVC-2 electrode shows the highest specific capacitance at different current densities. It affords a capacitance of 440 F/g at the current density of 0.25 A/g and preserves about 50% capacitance retention (200 F/g) even at the current density of 10 Ng. For comparison, the CNT electrode shows more than 60% capacitance retention at the same condition; however, its overall capacitance is low (55 F/g at the current density of 10 Ng). Similarly, although the $V_2O_5$ nanowire electrode shows a high capacitance at low discharge rates (e.g., 388 F/g at the current density of 0.25 Ng), only 20% of the capacitance is retained at the current density of 10 Ng, showing a poor rate capability.

The inserted plot in FIG. 22 illustrates the $V_2O_5$-based specific capacitances of the composites versus the $V_2O_5$ content at the current density of 1 Ng. The composite electrodes consistently show much higher specific capacitance than that of the pure $V_2O_5$ nanowire electrode, indicating that the CNT scaffold indeed facilitates the harvest of the $V_2O_5$ nanowire pseudocapacitance. The CVC-2 electrode exhibits the highest overall capacitance and $V_2O_5$-based specific capacitance. These charge-discharge behaviors are in good consistence with the results from the cyclic voltammograms.

Figure 23A:
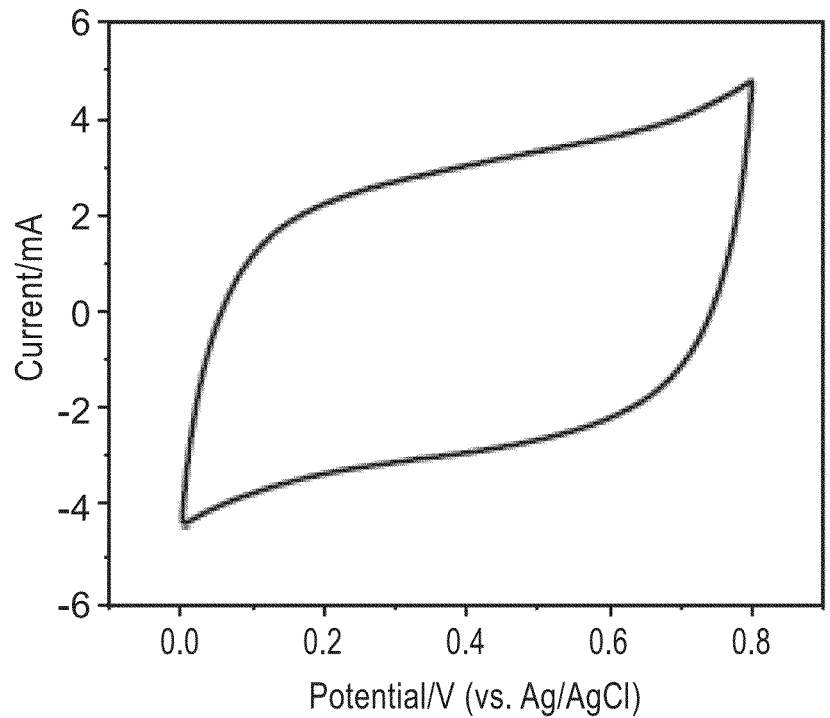
FIGS. 23A and 23B are (A) CV curves of mesoporous carbon supported $MnO_2$ ($MnO_2$/C) at scanning rate of 10 mV/s in 1 M aqueous $Na_2SO_4$ solution and (B) galvanostaic charge-discharge curves of $MnO_2$/C at a current density of 0.1 Ng at room temperature.
Figure 23B:
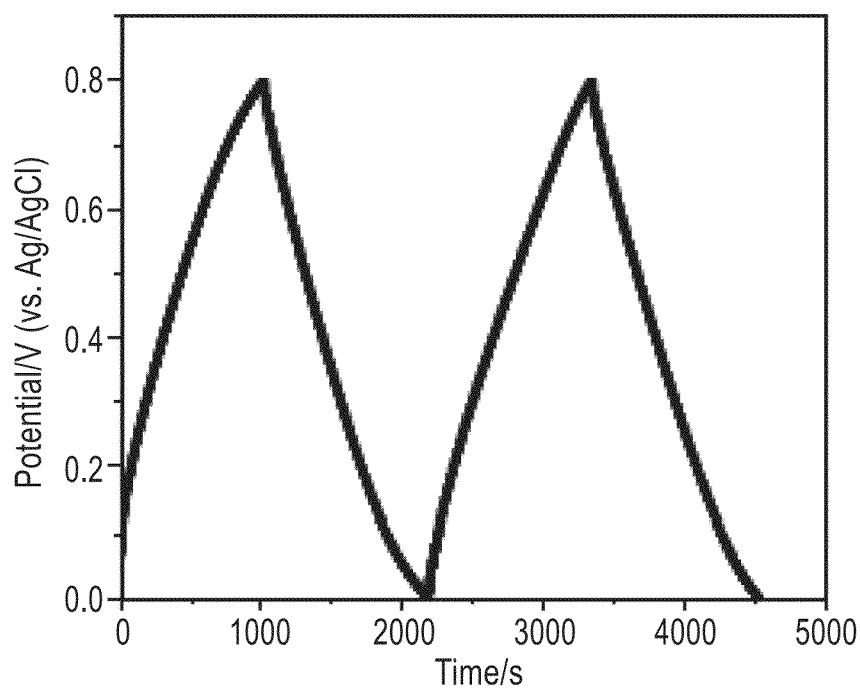
Figure 24A:
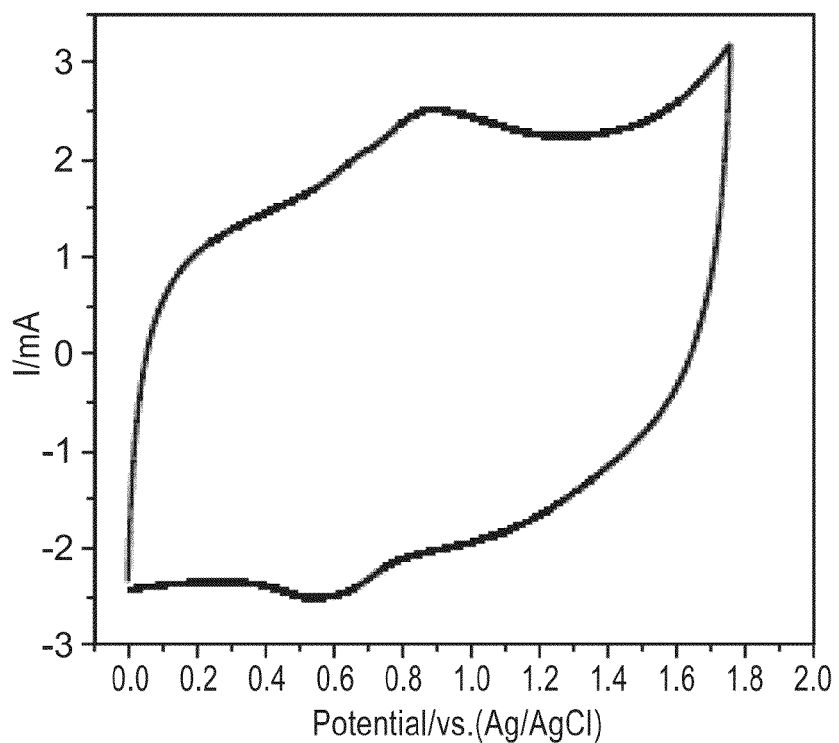
FIGS. 24A and 24B are (A) a CV curve of an asymmetric supercapacitor with a CVC-2 anode and a $MnO_2$/C cathode at scanning rate of 10 mV/s; and (B) galvanostaic charge-discharge of the asymmetric supercapacitor at different current densities (0.64 mA/cm², 3.2 mA/cm², 6.4 mA/cm²) in 1 M aqueous $Na_2SO_4$ solution at room temperature.
Figure 24B:
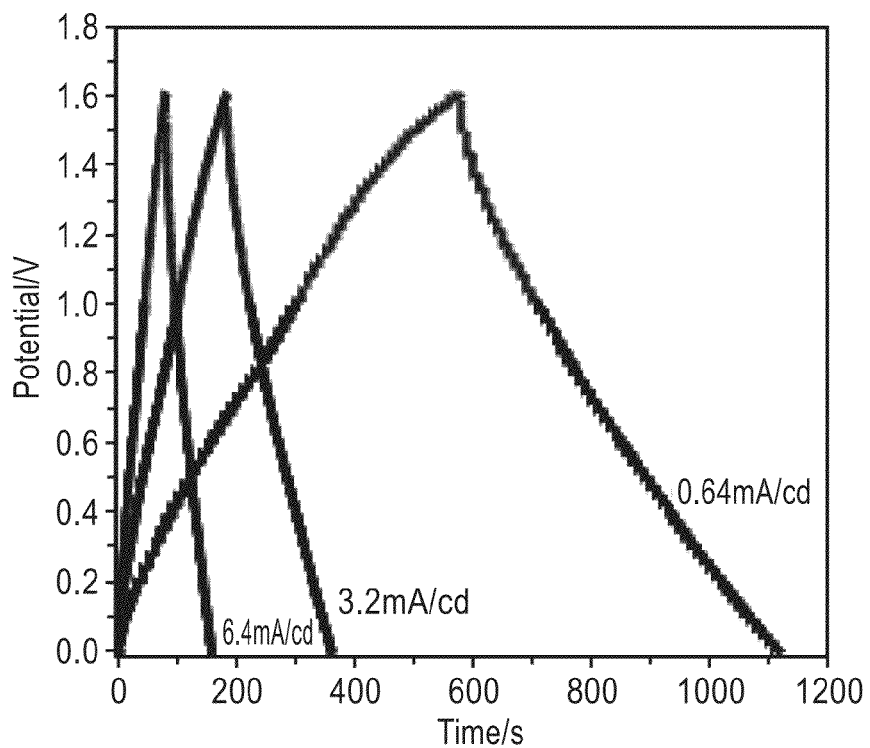

Referring to FIGS. 23A, 23B, 24A and 24B, to further evaluate the nanocomposite electrodes of the present invention for real device applications, supercapacitors were assembled using CVC-2 as the anode and $MnO_2$/C composite as the cathode. The typical cyclic voltammogram of the $MnO_2$/C electrode is shown in FIG. 23A. The rectangular-shaped CV plot indicates the ideal capacitive behavior of the electrode. Galvanostaic charge-discharge curves of $MnO_2$/C electrode at current density of 0.1 Ng reveals that the electrode material can provide a specific capacitance of 145 F/g, as calculated from FIG. 23B.

For the supercapacitor consisting of CVC-2 and $MnO_2$/C electrodes, an ideal capacitive behavior was observed from 0 to 1.6 V in 1 M $Na_2SO_4$ (FIG. 24). A capacitance of 45 F/g (based on the total weight of the anode and cathode materials) was achieved at the discharge current density of 0.64 mA/cm$^2$, corresponding to an energy density of 16 Wh/kg at power density of 75 W/kg. The device still possesses an energy density of 5.5 Wh/kg even at power density of 3750 W/kg and retains more than 90% of the initial capacitance after 100 cycles of charge and discharge, indicative of high power performance and good cycling stability.

Figure 25:
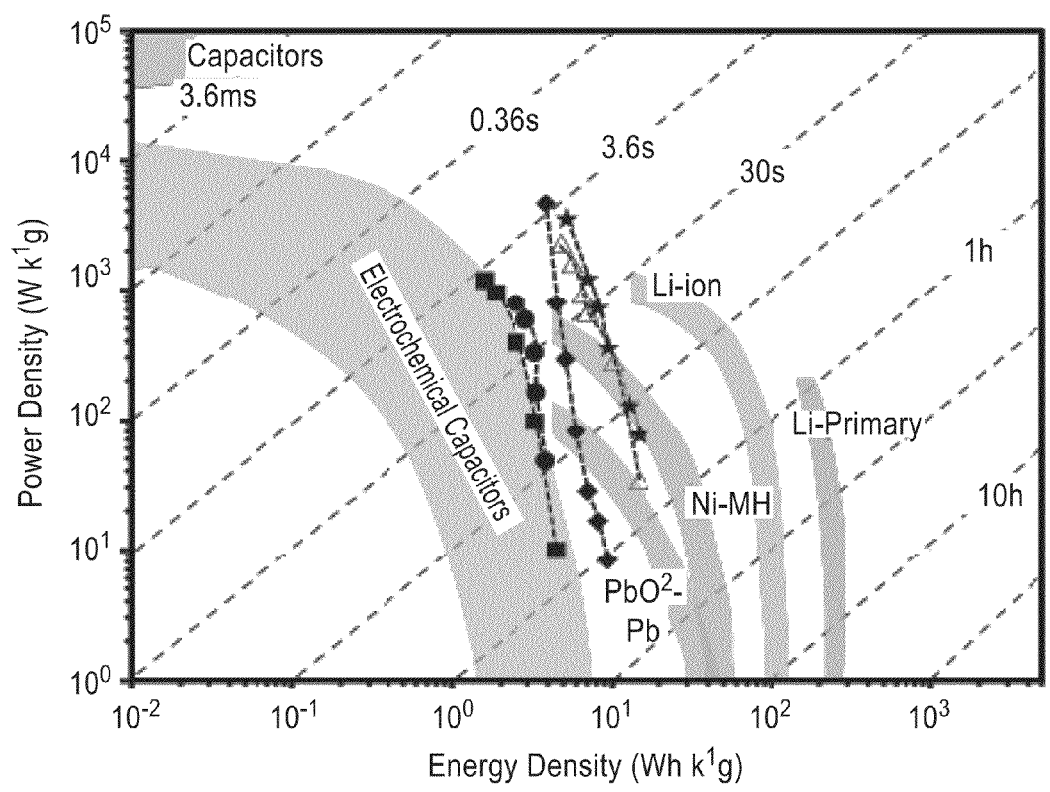
FIG. 25 is a Ragone plot of an asymmetric supercapacitor (★) consisting of a CVC-2 anode and an $MnO_2$/C cathode compared with carbon-based supercapacitors from active carbon (■), mesoporous carbon CMK-3 (●), hierarchical porous graphitic carbon (♦), and phosphorus-enriched carbon (▲).

Referring to FIG. 25, a Ragone plot derived from the constant-current charges and discharges (FIG. 24B) of the supercapacitor, in comparison with some advanced aqueous-based supercapacitors from recent literature, shows that the energy and power performance of this supercapacitor are highly competitive with Ni-MH batteries and significantly improved over the current electrochemical capacitors. Considering the specific capacitance of the cathode materials ($MnO_2/C$) is below 150 F/g (FIG. 23B), an even higher energy density could be realized if a better cathode material is available. Moreover, considering that the CNT, $V_2O_5$ precursor, and processing can be achieved at the cost comparable to that of traditional carbon-based devices; these composites hold great promises as the next generation electrical energy storage materials.

In one exemplary embodiment of the present invention, synthesis of the $CNT/V_2O_5$ nanowire composites was performed by functionalizing multi-wall CNTs to attach carboxylic groups to their surfaces. Briefly, pristine CNTs (12.0 g), $HNO_3$ (65%, 100 mL) and $H_2SO_4$ (98%, 300 mL) were mixed in a flask, vigorously stirred and reflux for 100 min. The mixture was diluted with deionized (DI) water, filtered, and re-dispersed in water. This process was repeated until the pH of the filtrate was around neutral. The functionalized CNTs were then dried in vacuum oven for 24 h at 80° C. A hydrothermal method was used to synthesize the composites. Briefly, appropriate amount of the modified CNTs, 0.15 g of ammonium metavanadate ($NH_4VO_3$) and 0.25 g of surfactant P123 ($EO_{20}PO_{70}EO_{20}$, where EO and PO are ethylene oxide and propylene oxide, respectively) were mixed under ultrasonication for 10 min. After stirring for one hour, the mixtures were transferred to a 20 mL Teflon-lined autoclave and heated to 120° C. for 24 h. The resulting precipitates were filtered and rinsed with water and acetone several times and dried at 80° C. for 12 h under vacuum. The amounts of CNTs used were varied from 0.037, 0.078, 0.15 to 0.6 g, resulting in the composites with 20, 33, 50, and 67 wt-% of the CNTs, which were denoted as CVC-1, CVC-2, CVC-3 and CVC-4, respectively. Corresponding $V_2O_5$ nanowire concentrations in exemplary embodiments of the present invention varied from 10 wt-% to 80 wt-%.

Synthesis of mesoporous carbon supported $MnO_2$ ($MnO_2/C$): mesoporous carbon was synthesized using sucrose as carbon source and silica cluster and colloid as templates. Simply, 0.1 g of as-prepared mesoporous carbon was soaked into a flask containing 100 mL of 0.1 M $KMnO_4$ aqueous solution under vacuum for 10 min. The mixture was kept stirring at 50° C. for 2 h for direct growth of $MnO_2$ onto the carbon surface. After the reaction, the as-derived powder was washed with DI-water several times and dried at vacuum at 80° C. for 12 h.

Material and Electrode Characterization: The X-ray diffraction measurements were taken on Panalytical X'Pert Pro X-ray powder diffractometer using the copper Kα radiation ($\lambda$=1.54 Å). Nitrogen sorption isotherms were measured at 77 K with a Micromeritics ASAP 2020 analyzer. The samples were degassed in vacuum at 180° C. for three hours. The specific surface areas ($S_{BET}$) were calculated by the Brunauer-Emmett-Teller (BET) method using adsorption branch in a relative pressure range from 0.04 to 0.25. The pore size distributions ($D_p$) were derived from the adsorption branches of isotherms using the Barrett-Joyner-Halenda (BJH) model.

Referring to FIGS. 27A, 27B and 27C, scanning electron microscope (SEM) experiments were conducted on a JEOL JSM-6700 FE-SEM. Transmission electron microscopy (TEM) experiments were conducted on a Philips CM120 operated at 120 kV. Exemplary $CNT/V_2O_5$ nanowire composite electrodes according to certain embodiments of the present invention were fabricated with thicknesses as high as several millimeters, as is evidenced by the SEM images (exact thicknesses are difficult to report given the composites' porous structures). Those skilled in the art will recognize that the novel fabrication methods described in the present application allow for great flexibility in engineering electrode thickness, and that the scope of the present invention is not limited to microns- or millimeters-thick electrodes (e.g., electrodes according to embodiments of the present invention were fabricated with thicknesses between 100 nm and several millimeters).

Figure 26A:
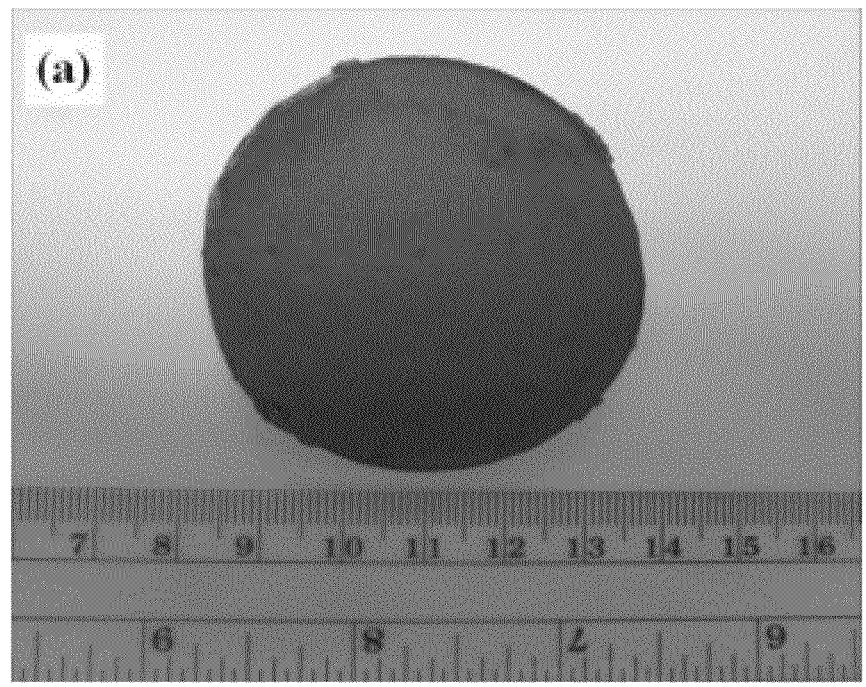
FIGS. 26A and 26B are photographs of (a) a CVC-2 nanocomposite film collected by filtration of the hydrothermal product described below with respect to certain embodiments of the present invention and (b) an electrode made from the composite.
Figure 26B:
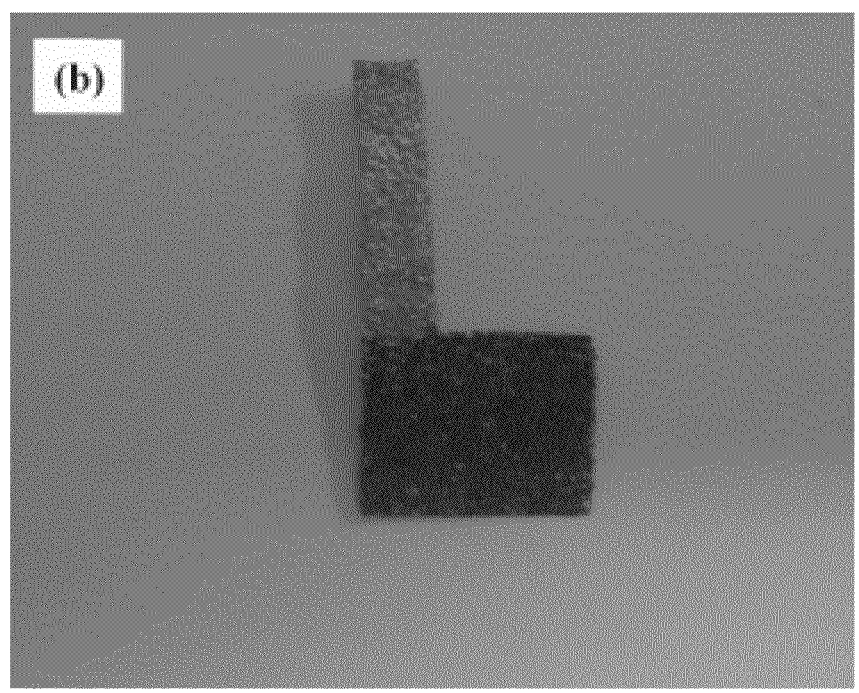

Referring to FIGS. 26A and 26B, the $CNT/V_2O_5$ nanowire composites and $MnO_2/C$ were assembled onto foam nickel collectors to fabricate porous electrodes (FIG. 26B). Briefly, 80% of the testing materials, 10% carbon black, and 10% poly(vinylidene fluoride) (PVDF) dispersed in N-methylpyrrolidinone (NMP) were mixed to form slurries. The slurries were ultrasonically treated at 60° C. for 0.5 h, coated on a nickel foam substrate, and dried at 80° C. for 10 min under vacuum. As formed electrodes were then pressed at a pressure of 2 MPa and further dried under vacuum at 100° C. for 12 h. The electrochemical measurements were conducted in a Princeton VMP3 electrochemistry workstation.

Cyclic voltammetry measurements were conducted in 1 M $Na_2SO_4$ aqueous solution at room temperature using a platinum wire as the counter electrode and an Ag/AgCl electrode as the reference electrode. The specific capacitance (C) of the electrode materials were derived from the formula $C=I/(dE/dt) \approx I/(\Delta E/\Delta t)$, where I is the constant discharge current density, E is cell voltage, and dE/dt is slope of the discharge curve.

From the discussion above it will be appreciated that the invention can be embodied in various ways, including the following:

1. An asymmetric supercapacitor, comprising: a first structure; and a second structure spaced apart from said second structure; wherein one of the first and second structures comprises an anode, and one of the first and second structures comprises a cathode; wherein the first structure comprises an activated carbon electrode; wherein the second structure comprises a nanocomposite electrode; and wherein the nanocomposite electrode comprises a first network of nanowires that are interpenetrating with a second network of nanowires.

2. An asymmetric supercapacitor as recited in embodiment 1, wherein the first network of nanowires and second network of nanowires form a composite mesh of nanowires that form hierarchical porous channels, such that substantially all pores in the supercapacitor electrode have diameters less than 20 nm or greater than 100 nm.

3. An asymmetric supercapacitor as recited in embodiment 1, wherein the first network of nanowires comprises metal oxide nanowires.

4. An asymmetric supercapacitor as recited in embodiment 3, wherein the second network of nanowires comprise carbon nanotubes (CNTs).

5. An asymmetric supercapacitor as recited in embodiment 4, wherein the first network of nanowires comprises $V_2O_5$ nanowires.

6. An asymmetric supercapacitor as recited in embodiment 4, wherein the CNT's provide conductive pathways for electron transport and current collection.

7. An asymmetric supercapacitor as recited in embodiment 4, wherein the first structure comprises the anode and the second structure comprises the cathode.

8. An asymmetric supercapacitor as recited in embodiment 4, wherein the first structure comprises the cathode and the second structure comprises the anode.

9. An asymmetric supercapacitor as recited in embodiment 4, wherein the nanocomposite electrode has a thickness greater than 100 μm.

10. An asymmetric supercapacitor as recited in embodiment 4, wherein the first and second structures each comprise a substrate supporting the active carbon and nanocomposite electrodes; and wherein the supercapacitor further comprises an electrically insulating separator between the first structure and the second structure.

11. An electrical energy storage device, comprising: an anode; and a cathode; wherein the anode comprises an activated carbon electrode; wherein the cathode comprises a nanocomposite electrode; and wherein the nanocomposite electrode comprises a first network of nanowires that are interpenetrating with a second network of nanowires to form a mesh structure.

12. An electrical energy storage device as recited in embodiment 11, wherein the mesh structure forms hierarchical porous channels, such that substantially all pores in the supercapacitor electrode have diameters less than 20 nm or greater than 100 nm.

13. An electrical energy storage device as recited in embodiment 11, wherein the first network of nanowires comprises metal oxide nanowires.

14. An electrical energy storage device as recited in embodiment 13, wherein the second network of nanowires comprise carbon nanotubes (CNTs).

15. An electrical energy storage device as recited in embodiment 14, wherein the first network of nanowires comprises $V_2O_5$ nanowires.

16. An electrical energy storage device as recited in embodiment 14, wherein the CNT's provide conductive pathways for electron transport and current collection.

17. An electrical energy storage device as recited in embodiment 14, wherein the nanocomposite electrode has a thickness greater than 100 μm.

18. An electrical energy storage device as recited in embodiment 16, further comprising: an electrolyte; wherein the mesh structure forms hierarchical porous channels; wherein the $V_2O_5$ nanowires are configured to react with said electrolyte; and wherein the porous channels promote electrolyte transport.

19. An electrical energy storage device, comprising: an anode; and a cathode; wherein the cathode comprises an activated carbon electrode; wherein the anode comprises a nanocomposite electrode; and wherein the nanocomposite electrode comprises a first network of nanowires that are interpenetrating with a second network of nanowires to form a mesh structure having hierarchical porous channels.

20. An electrical energy storage device as recited in embodiment 19, wherein the first network of nanowires comprises metal oxide nanowires.

21. An electrical energy storage device as recited in embodiment 20, wherein the second network of nanowires comprise carbon nanotubes (CNTs).

22. An electrical energy storage device as recited in embodiment 21, wherein the first network of nanowires comprises $V_2O_5$ nanowires.

23. An electrical energy storage device as recited in embodiment 21, wherein the nanocomposite electrode has a thickness greater than 100 μm.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An asymmetric supercapacitor, comprising:
   a first structure; and
   a second structure spaced apart from said second structure;
   wherein one of the first and second structures comprises an anode, and one of the first and second structures comprises a cathode;
   wherein the first structure comprises an activated carbon electrode;
   wherein the second structure comprises a nanocomposite electrode;
   wherein the nanocomposite electrode comprises a first network of nanowires that are interpenetrating with a second network of nanowires; and
   wherein the interpenetrating first and second networks of nanowires form a mesh structure.

2. An asymmetric supercapacitor as recited in claim 1, wherein the first network of nanowires and second network of nanowires form a composite mesh of nanowires that form hierarchical porous channels, such that substantially all pores in the supercapacitor electrode have diameters less than 20 nm or greater than 100 nm.

3. An asymmetric supercapacitor as recited in claim 1, wherein the first network of nanowires comprises metal oxide nanowires.

4. An asymmetric supercapacitor as recited in claim 3, wherein the second network of nanowires comprise carbon nanotubes (CNTs).

5. An asymmetric supercapacitor as recited in claim 4, wherein the first network of nanowires comprises $V_2O_5$ nanowires.

6. An asymmetric supercapacitor as recited in claim 4, wherein the CNT's provide conductive pathways for electron transport and current collection.

7. An asymmetric supercapacitor as recited in claim 4, wherein the first structure comprises the anode and the second structure comprises the cathode.

8. An asymmetric supercapacitor as recited in claim 4, wherein the first structure comprises the cathode and the second structure comprises the anode.

9. An asymmetric supercapacitor as recited in claim 4, wherein the nanocomposite electrode has a thickness greater than 100 µm.

10. An asymmetric supercapacitor as recited in claim 4, wherein the first and second structures each comprise a substrate supporting the active carbon and nanocomposite electrodes; and wherein the supercapacitor further comprises an electrically insulating separator between the first structure and the second structure.

11. An asymmetric supercapacitor as recited in claim 1, wherein the mesh structure forms hierarchical porous channels, such that substantially all pores in the supercapacitor electrode have diameters less than 20 nm or greater than 100 nm.

12. An asymmetric supercapacitor as recited in claim 1, wherein the first network of nanowires comprises metal oxide nanowires.

13. An asymmetric supercapacitor as recited in claim 12, wherein the second network of nanowires comprise carbon nanotubes (CNTs).

14. An asymmetric supercapacitor as recited in claim 13, wherein the first network of nanowires comprises $V_2O_5$ nanowires.

15. An asymmetric supercapacitor as recited in claim 14, further comprising:
an electrolyte;
wherein the mesh structure forms hierarchical porous channels;
wherein the $V_2O_5$ nanowires are configured to react with said electrolyte; and
wherein the porous channels promote electrolyte transport.

16. An asymmetric supercapacitor as recited in claim 13, wherein the CNTs provide conductive pathways for electron transport and current collection.

17. An asymmetric supercapacitor as recited in claim 13, wherein the nanocomposite electrode has a thickness greater than 100 µm.

18. An asymmetric supercapacitor as recited in claim 1, wherein the interpenetrating first and second networks of nanowires form a mesh structure having hierarchical porous channels.

19. An asymmetric supercapacitor as recited in claim 18, wherein the first network of nanowires comprises metal oxide nanowires.

20. An asymmetric supercapacitor as recited in claim 19, wherein the second network of nanowires comprise carbon nanotubes (CNTs).

21. An asymmetric supercapacitor as recited in claim 20, wherein the first network of nanowires comprises $V_2O_5$ nanowires.

22. An asymmetric supercapacitor as recited in claim 20, wherein the nanocomposite electrode has a thickness greater than 100 µm.

* * * * *